(12) United States Patent
Xu et al.

(10) Patent No.: US 12,026,938 B2
(45) Date of Patent: Jul. 2, 2024

(54) NEURAL ARCHITECTURE SEARCH METHOD AND IMAGE PROCESSING METHOD AND APPARATUS

(71) Applicant: HUAWEI TECHNOLOGIES CO., LTD., Guangdong (CN)

(72) Inventors: Yuhui Xu, Shenzhen (CN); Lingxi Xie, Beijing (CN); Xiaopeng Zhang, Shanghai (CN); Xin Chen, Shenzhen (CN); Guojun Qi, Shenzhen (CN); Qi Tian, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 369 days.

(21) Appl. No.: 17/573,220

(22) Filed: Jan. 11, 2022

(65) Prior Publication Data

US 2022/0130142 A1   Apr. 28, 2022

Related U.S. Application Data

(63) Continuation of application No. PCT/CN2020/089403, filed on May 9, 2020.

(30) Foreign Application Priority Data

Jul. 12, 2019   (CN) .......................... 201910627480.7

(51) Int. Cl.
*G06V 10/82*   (2022.01)
*G06N 3/082*   (2023.01)
(Continued)

(52) U.S. Cl.
CPC ............. *G06V 10/82* (2022.01); *G06N 3/082* (2013.01); *G06N 3/10* (2013.01); *G06V 10/764* (2022.01)

(58) Field of Classification Search
None
See application file for complete search history.

(56) References Cited

U.S. PATENT DOCUMENTS 9,875,254 B2 *   1/2018   Lallican ............. G06V 30/1423
11,625,611 B2 *   4/2023   Laszlo .................. G06N 20/20
                                                    706/25
(Continued)

FOREIGN PATENT DOCUMENTS

CN   109284820 A   1/2019
CN   109919304 A   6/2019
(Continued)

OTHER PUBLICATIONS

Liu et al., "DARTS: Differentiable Architecture Search," ICLR 2019 Conference Blind Submission, Sep. 2018, 13 pages.
(Continued)

*Primary Examiner* — Anand P Bhatnagar
(74) *Attorney, Agent, or Firm* — Fish & Richardson P.C.

(57) ABSTRACT

Example neural architecture search methods and image processing methods and apparatuses in the field of computer vision in the field of artificial intelligence are provided. The example neural architecture search method includes determining search space and a plurality of construction units, superimposing the plurality of construction units to obtain a search network, adjusting, in the search space, network architectures of the construction units in the search network, to obtain optimized construction units, and establishing a target neural network based on the optimized construction units. In each construction unit, some channels of an output feature map of each node are processed by using a to-be-selected operation to obtain a processed feature map, and the processed feature map and a remaining feature map are stitched and then input to a next node.

19 Claims, 15 Drawing Sheets

(51) Int. Cl.
  *G06N 3/10*   (2006.01)
  *G06V 10/764*  (2022.01)

(56) References Cited

U.S. PATENT DOCUMENTS

| | | | | |
|---|---|---|---|---|
| 11,676,078 | B2* | 6/2023 | Nori | G06F 18/2413 |
| | | | | 706/15 |
| 11,907,853 | B2* | 2/2024 | Fernando | G06F 16/9024 |
| 2009/0132449 | A1 | 5/2009 | Nagashima | |
| 2020/0293899 | A1* | 9/2020 | Fernando | G06N 3/045 |
| 2022/0004709 | A1* | 1/2022 | Wu | G06N 3/042 |
| 2023/0134742 | A1* | 5/2023 | Li | G06F 17/16 |
| | | | | 726/22 |
| 2023/0229891 | A1* | 7/2023 | Laszlo | G06N 3/082 |
| | | | | 706/25 |
| 2023/0229901 | A1* | 7/2023 | Laszlo | G06N 3/04 |
| | | | | 706/26 |

FOREIGN PATENT DOCUMENTS

| | | | | |
|---|---|---|---|---|
| CN | 109978142 A | | 7/2019 | |
| WO | WO-2019081705 A1 * | | 5/2019 | G06F 16/9024 |

OTHER PUBLICATIONS

PCT International Search Report and Written Opinion issued in International Application No. PCT/CN2020/089403 on Jun. 30, 2020, 18 pages (with English translation).

Real et al., "Regularized Evolution for Image Classifier Architecture Search," arXiv:1802.01548v1, Feb. 2018, 10 pages.

* cited by examiner

NEURAL ARCHITECTURE SEARCH METHOD AND IMAGE PROCESSING METHOD AND APPARATUS

CROSS-REFERENCE TO RELATED APPLICATIONS

This application is a continuation of International Application No. PCT/CN2020/089403, filed on May 9, 2020, which claims priority to Chinese Patent Application No. 201910627480.7, filed on Jul. 12, 2019. The disclosures of the aforementioned applications are hereby incorporated by reference in their entireties.

TECHNICAL FIELD

This application relates to the field of artificial intelligence, and in particular, to a neural architecture search method and an image processing method and apparatus.

BACKGROUND

Artificial intelligence (artificial intelligence, AI) is a theory, a method, a technology, or an application system that simulates, extends, and expands human intelligence by using a digital computer or a machine controlled by a digital computer, to perceive an environment, obtain knowledge, and achieve an optimal result by using the knowledge. In other words, the artificial intelligence is a branch of computer science, and is intended to understand essence of intelligence and produce a new intelligent machine that can react in a manner similar to the human intelligence. The artificial intelligence is to study design principles and implementation methods of various intelligent machines, so that the machines have perceiving, inference, and decision-making functions. Researches in an artificial intelligence field include a robot, natural language processing, computer vision, decision-making and inference, human-computer interaction, recommendation and search, an AI basic theory, and the like.

With rapid development of artificial intelligence technologies, a neural network (for example, a deep neural network) has scored great achievements in processing and analyzing a plurality of media signals such as an image, a video, and voice. A neural network with excellent performance often has a delicate network architecture that requires a lot of effort to be established by highly skilled and experienced human experts. To better establish a neural network, a neural architecture search (neural architecture search, NAS) method is proposed to establish a neural network, and a neural architecture with excellent performance is obtained by automatically searching a neural architecture.

In a conventional solution, a differentiable neural architecture search method is often used to establish a neural network. In the conventional solution, a search network is usually established based on a specific quantity of construction units, then connection relationships between nodes of the construction units in the search network are optimized in search space, to obtain optimized construction units, and finally a target neural network is established based on the optimized construction units. However, in a process of optimizing the construction units in the conventional solution, an output feature map of each node needs to be processed by using all optional operations, an amount of data that needs to be processed is relatively large, and search overheads are high.

SUMMARY

This application provides a neural architecture search method, an image processing method and apparatus, a computer-readable storage medium, and a chip, to reduce search overheads.

According to a first aspect, a neural architecture search method is provided. The method includes: determining search space and a plurality of construction units; superimposing the plurality of construction units to obtain a search network; optimizing, in the search space, network architectures of the construction units in the search network, to obtain optimized construction units; and establishing a target neural network based on the optimized construction units.

The construction unit is a network architecture obtained by connecting a plurality of nodes by using a basic operation of a neural network. The construction unit is a basic module configured to establish a neural network, and the neural network may be established by using the construction unit.

In each of the plurality of construction units, some channels of an output feature map of each node are processed by using a to-be-selected operation, to obtain a processed feature map, and an input feature map of a next node of each node is a feature map obtained by stitching the processed feature map and a remaining feature map that is of each node and that is not processed by using the to-be-selected operation.

The next node of each node may be a node that is connected to each node and to which the feature map obtained after some channels of the output feature map of each node are processed by using the to-be-selected operation is input.

Specifically, in each of the plurality of construction units, the output feature map of each node has c channels, c/K channels of the output feature map of each node are processed by using the to-be-selected operation, to obtain the processed feature map, and the input feature map of the next node of each node is a feature map obtained by stitching the processed feature map and the remaining feature map. The processed feature map has c/K channels, the remaining feature map has $c\times(K-1)/K$ channels, the remaining feature map is a feature map that is output by each node and that is not processed by using the to-be-selected operation, c and K are both integers greater than 1, and the to-be-selected operation includes all operations in the search space.

In other words, in each of the plurality of construction units, only some channels of the output feature map of each node are processed by using the to-be-selected operation, and the processed feature map and the remaining feature map are stitched and input to the next node of each node as an input feature map of the next node.

For example, one construction unit includes a first node and a second node, and the second node is a next node of the first node. An output feature map of the first node has c channels, and c/K channels of the output feature map of the first node are processed by using the to-be-selected operation, to obtain a processed feature map. An input feature map of the second node is a feature map obtained by stitching the processed feature map and a remaining feature map, and the remaining feature map is a feature map that is output by the first node and that is not processed by using the to-be-selected operation.

Optionally, the search space is determined based on an application requirement of a to-be-established target neural network.

Specifically, the search space may be determined based on a type of data processed by the target neural network.

When the target neural network is a neural network used to process image data, types and a quantity of operations included in the search space need to adapt to image data processing.

For example, when the target neural network is a neural network used to process image data, the search space may include a convolution operation, a pooling operation, a skip connection (skip connect) operation, and the like.

When the target neural network is a neural network used to process voice data, types and a quantity of operations included in the search space need to adapt to voice data processing.

For example, when the target neural network is a neural network used to process voice data, the search space may include an activation function (for example, ReLU or Tanh) and the like.

Optionally, the search space is determined based on an application requirement of the target neural network and a condition of a video random access memory resource of a device performing neural architecture searching.

The condition of the video random access memory resource of the device performing neural architecture searching may be a size of the video random access memory resource of the device performing neural architecture searching.

The types and the quantity of operations included in the search space may be determined based on the application requirement of the target neural network and the condition of the video random access memory resource of the device performing neural architecture searching.

Specifically, the types and the quantity of operations included in the search space may be first determined based on the application requirement of the target neural network, and then the types and the quantity of operations included in the search space are adjusted based on the condition of the video random access memory resource of the device performing neural architecture searching, to determine types and a quantity of operations finally included in the search space.

For example, after the types and the quantity of operations included in the search space are determined based on the application requirement of the target neural network, if there are relatively few video random access memory resources of the device performing neural architecture searching, some operations that are less important in the search space may be deleted. If there are relatively sufficient video random access memory resources of the device performing neural architecture searching, the types and the quantity of operations included in the search space may remain unchanged, or the types and the quantity of operations included in the search space are increased.

The video random access memory resource may be replaced with a cache resource, and the cache resource is a memory or a storage unit used by a device for establishing the neural network to store operation data in an optimization process. The cache resource may specifically include a video random access memory resource.

Optionally, a quantity of construction units is determined based on the condition of the video random access memory resource of the device performing neural architecture searching.

Specifically, when there are relatively few video random access memory resources of the device performing neural architecture searching, the quantity of construction units may be few. When there are relatively sufficient video random access memory resources of the device performing neural architecture searching, the quantity of construction units may be large.

Optionally, the quantity of construction units is determined based on the application requirement of the to-be-established target neural network and the condition of the video random access memory resource of the device performing neural architecture searching.

Specifically, an initial quantity of construction units may be first determined based on the application requirement of the target neural network, and then the initial quantity of construction units is further adjusted based on the video random access memory resource of the device performing neural architecture searching, to determine a final quantity of construction units.

For example, after the initial quantity of construction units is determined based on the application requirement of the target neural network, if there are relatively few video random access memory resources of the device performing neural architecture searching, the quantity of construction units may further be reduced. If there are relatively sufficient video random access memory resources of the device performing neural architecture searching, the initial quantity of construction units remains unchanged. In this case, the initial quantity of construction units is the final quantity of construction units.

In this application, during neural architecture searching, because only some channels of the output feature map of each node in the construction unit are processed by using the to-be-selected operation, a quantity of channels of the feature map that are processed by using the to-be-selected operation is reduced. This further reduces a video random access memory occupied during searching, and reduces search overheads.

In addition, in this application, some channels of the output feature map of each node are selected to be processed by using the to-be-selected operation, so that an amount of data processed by using the to-be-selected operation is reduced. This may reduce a possibility of overfitting of a finally established target network to some extent.

Further, because the video random access memory occupied during searching can be reduced in this application, in a case of occupying a same video random access memory resource, an amount of each batch of data that is processed during network searching can be increased in this application. This implements searching for a more complex neural architecture.

Optionally, the superimposing the plurality of construction units to obtain a search network includes: sequentially superimposing the plurality of construction units in a preset superimposing manner to obtain the search network, where in the search network, an output of a previous construction unit is an input of a next construction unit.

The foregoing preset superimposing manner may include information such as a type of construction unit, a location of a construction unit, and a quantity of superimposed construction units.

With reference to the first aspect, in some implementations of the first aspect, that an input feature map of a next node of each node is a feature map obtained by stitching the processed feature map and a remaining feature map includes: the input feature map of the next node of each node is a feature map obtained by stitching the processed feature map and the remaining feature map and reversing a channel sequence.

Reversing the channel sequence may be re-adjusting a channel sequence of a stitched feature map.

After the processed feature map is obtained, the processed feature map and the remaining feature map may be stitched, to obtain the stitched feature map, and the channel sequence of the stitched feature map is reversed. Then, a feature map obtained after the channel sequence is reversed is input to the next node.

Alternatively, after the foregoing processed feature map is obtained, a channel sequence of the processed feature map and a channel sequence of the remaining feature map are reversed first, feature maps obtained after channel sequences are reversed are stitched, and then a stitched feature map is input to the next node for processing.

In this application, the channel sequence of the stitched feature map is reversed, and the channel sequence of the stitched feature map can be disordered, so that the next node may randomly select some channels of the feature map for processing. This may increase randomness of input data, and avoid overfitting of the finally obtained target neural network as much as possible.

With reference to the first aspect, in some implementations of the first aspect, each of the plurality of construction units includes an input node and a plurality of intermediate nodes, a connection between nodes of each construction unit forms an edge, an input of each of the plurality of intermediate nodes is a sum of products of a plurality of corresponding input feature maps and edge weight parameters respectively corresponding to the plurality of input feature maps, each input corresponds to one edge weight parameter, and an edge weight parameter corresponding to each input is used to indicate a weight of each input during input to each intermediate node.

There may be one or more input nodes.

In this application, importance degrees of different edges can be measured by setting an edge weight parameter. In an optimizing process, an edge whose corresponding edge weight parameter value is relatively large may be selected, and an edge whose edge weight parameter value is relatively small is discarded. Therefore, the finally established target neural network maintains specific stability.

With reference to the first aspect, in some implementations of the first aspect, the optimizing, in the search space, network architectures of the construction units in the search network, to obtain optimized construction units includes: adjusting, in the search space, network architecture parameters of the construction units in the search network, to obtain the optimized construction units.

The network architecture parameter of the construction unit includes a to-be-selected operation weight parameter and the edge weight parameter, the optimized construction unit reserves edges corresponding to some edge weight parameters, and the optimized construction unit reserves operations corresponding to some to-be-selected operation weight parameters.

For the optimized construction unit, edges corresponding to some edge weight parameter values with relatively large parameter values may be reserved, and operations corresponding to some to-be-selected operation weight parameters with relatively large parameter values may be reserved.

With reference to the first aspect, in some implementations of the first aspect, each of the plurality of construction units includes the input node and the plurality of intermediate nodes, each of the plurality of intermediate nodes corresponds to one level.

An intermediate node at a first level is connected to the input node, an intermediate node at an $i^{th}$ level is connected to the input node, the intermediate node at the $i^{th}$ level is connected to an intermediate node at a previous $(i-1)^{th}$ level, and i is an integer greater than 1.

There may be one or more input nodes. When there are a plurality of input nodes, the intermediate node at the first level is connected to each input node.

With reference to the first aspect, in some implementations of the first aspect, K is determined based on the size of the video random access memory resource of the device performing the method.

A value of K may be set to a multiple of 2, for example, 2, 4, 6, or 8.

Specifically, when the video random access memory resource of the device performing the foregoing method is relatively large, K may be set to a relatively small value. When the video random access memory resource of the device performing the foregoing method is relatively small, K may be set to a relatively large value.

For example, when the video random access memory resource of the device performing the foregoing method is relatively large, K is set to 4. When the video random access memory resource of the device performing the foregoing method is relatively small, K is set to 8.

Alternatively, the value of K may be determined based on both the size of the video random access memory resource of the device performing the foregoing method and performance of the target neural network.

Specifically, a value of K may be first set based on the size of the video random access memory resource of the device performing the foregoing method, and then the value of K is adjusted based on performance of the target neural network.

For example, K may be set to 6 or 8 based on the size of the video random access memory resource of the device performing the foregoing method. However, when K is equal to 8, performance of the target neural network is not ideal, and when K is equal to 6, performance of the target neural network meets a requirement. Therefore, K may be set to 6.

Performance of the target neural network existing when K is set to different values may be obtained based on a test result.

According to a second aspect, an image processing method is provided. The method includes: obtaining a to-be-processed image; and classifying the to-be-processed image based on a target neural network, to obtain a classification result of the to-be-processed image.

The target neural network is established by using a plurality of optimized construction units, and the plurality of optimized construction units is obtained by optimizing network architectures of a plurality of construction units in a search network. In each of the plurality of construction units, c/K channels of an output feature map of each node are processed by using a to-be-selected operation, to obtain a processed feature map, and an input feature map of a next node of each node is a feature map obtained by stitching the processed feature map and a remaining feature map. The output feature map of each node has c channels, the processed feature map has c/K channels, and the remaining feature map has c×(K−1)/K channels. The remaining feature map is a feature map that is output by each node and that is not processed by using the to-be-selected operation, the to-be-selected operation includes all operations in the search space, and c and K are both integers greater than 1.

In this application, in a process of establishing the target neural network, some channels of the output feature map of each node in each construction unit are processed by using the to-be-selected operation, to reduce overfitting of a finally obtained target neural network. Therefore, image classification can be better performed by using the target neural network.

It should be understood that, in the method of the second aspect, the target neural network is established by using the optimized construction units, and the target neural network may be a neural network trained by using training data (including a training image and a classification result of the training image). When the target neural network processes a to-be-processed image, all channels of an output feature map of each node in each optimized construction unit are processed by using a to-be-selected operation, and a feature map obtained after to-be-selected operation processing is input to a next node. This is a difference between image processing by using the target neural network and obtaining the target neural network through neural architecture search processing.

With reference to the second aspect, in some implementations of the second aspect, that an input feature map of a next node of each node is a feature map obtained by stitching the processed feature map and a remaining feature map includes: the input feature map of the next node of each node is a feature map obtained by stitching the processed feature map and the remaining feature map and reversing a channel sequence.

In this application, in the process of establishing the target neural network, a channel sequence of a stitched feature map is reversed, and the channel sequence of the stitched feature map can be disordered, so that the next node may randomly select some channels of the feature map for processing. This may increase randomness of input data, and avoid overfitting of the finally obtained target neural network as much as possible. Therefore, image classification can be better performed by using the target neural network.

With reference to the second aspect, in some implementations of the second aspect, each of the plurality of construction units includes an input node and a plurality of intermediate nodes, a connection between nodes of each construction unit forms an edge, an input of each of the plurality of intermediate nodes is a sum of products of a plurality of corresponding inputs and edge weight parameters respectively corresponding to the plurality of inputs, each input corresponds to one edge weight parameter, and an edge weight parameter corresponding to each input is used to indicate a weight of each input during input to each intermediate node.

In this application, in the process of establishing the target neural network, importance degrees of different edges can be measured by setting an edge weight parameter. In an optimizing process, an edge whose corresponding edge weight parameter value is relatively large may be selected, and an edge whose edge weight parameter value is relatively small is discarded. Therefore, the finally established target neural network maintains specific stability.

With reference to the second aspect, in some implementations of the second aspect, each of the plurality of construction units includes the input node and the plurality of intermediate nodes, each of the plurality of intermediate nodes corresponds to one level, an intermediate node at a first level is connected to the input node, an intermediate node at an $i^{th}$ level is connected to the input node, the intermediate node at the $i^{th}$ level is connected to an intermediate node at a previous $(i-1)^{th}$ level, and i is an integer greater than 1.

According to a third aspect, an image processing method is provided. The method includes: obtaining a to-be-processed image; and processing the to-be-processed image based on a target neural network, to obtain a processing result of the to-be-processed image.

Processing the image may be performing recognition, classification, detection, or the like on the image.

According to a fourth aspect, an image processing method is provided. The method includes: obtaining a road picture; performing convolution processing on the road picture based on a target neural network, to obtain a plurality of convolutional feature maps of the road picture; and performing deconvolution processing on the plurality of convolutional feature maps of the road picture based on the target neural network, to obtain a semantic segmentation result of the road picture.

The target neural network is a target neural network established based on any one of the implementations of the first aspect.

According to a fifth aspect, an image processing method is provided. The method includes: obtaining a face image; performing convolution processing on the face image based on a target neural network, to obtain a convolutional feature map of the face image; and comparing the convolutional feature map of the face image with a convolutional feature map of an identification card image, to obtain a verification result of the face image.

The convolutional feature map of the identification card image may be obtained in advance and stored in a corresponding database. For example, convolution processing is performed on the identification card image in advance, and the obtained convolutional feature map is stored in the database.

In addition, the target neural network is a target neural network established based on any one of the implementations of the first aspect.

It should be understood that extensions to, limitations on, explanations for, and description of corresponding content in the first aspect are also applicable to same content in the second aspect, the third aspect, the fourth aspect, and the fifth aspect.

According to a sixth aspect, a neural architecture search apparatus is provided. The apparatus includes: a memory, configured to store a program; and a processor, configured to execute the program stored in the memory, where when executing the program stored in the memory, the processor is configured to perform the method in any one of the implementations of the first aspect.

According to a seventh aspect, an image processing apparatus is provided. The apparatus includes: a memory, configured to store a program; and a processor, configured to execute the program stored in the memory, where when executing the program stored in the memory, the processor is configured to perform the methods in any one of the implementations of the second aspect to the fifth aspect.

According to an eighth aspect, a computer-readable medium is provided. The computer-readable medium stores program code used by a device for execution, and the program code is used by the device to perform the methods in any one of the implementations of the first aspect to the fifth aspect.

According to a ninth aspect, a computer program product including instructions is provided. When the computer program product is run on a computer, the computer is enabled to perform the methods in any one of the implementations of the first aspect to the fifth aspect.

According to a tenth aspect, a chip is provided. The chip includes a processor and a data interface, and the processor reads, through the data interface, instructions stored in a memory, to perform the methods in any one of the implementations of the first aspect to the fifth aspect.

Optionally, as an implementation, the chip may further include the memory. The memory stores the instructions, the processor is configured to execute the instructions stored in the memory, and when executing the instructions, the processor is configured to perform the methods in any one of the implementations of the first aspect to the fifth aspect.

DESCRIPTION OF EMBODIMENTS

The following describes technical solutions in embodiments of this application with reference to the accompanying drawings in the embodiments of this application.

Figure 1:
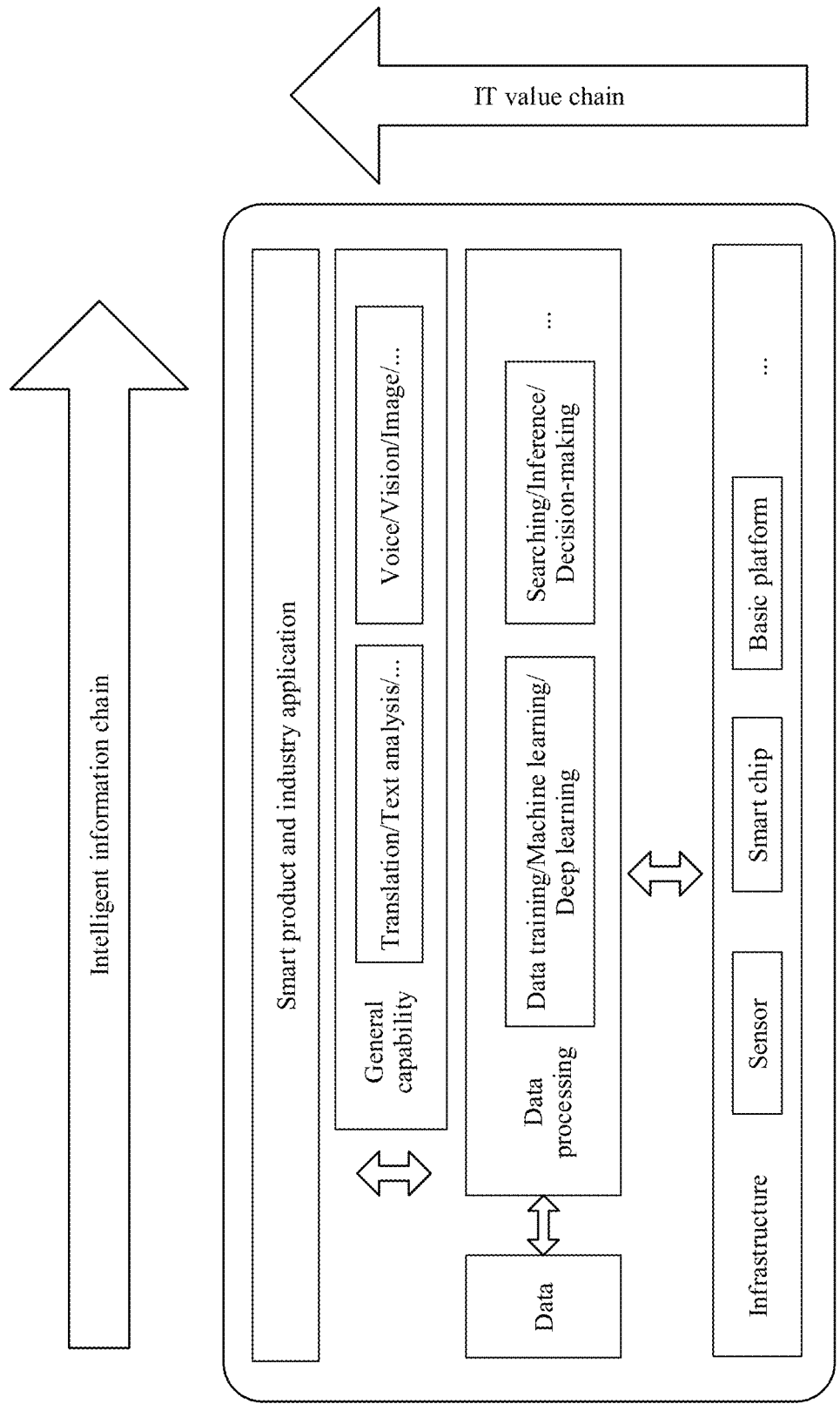
FIG. 1 is a schematic diagram of an artificial intelligence main framework according to an embodiment of this application.

FIG. 1 is a schematic diagram of an artificial intelligence main framework. The main framework describes an overall working procedure of an artificial intelligence system, and is applicable to a requirement of a general artificial intelligence field.

The following describes in detail the foregoing artificial intelligence main framework from two dimensions: an "intelligent information chain" (horizontal axis) and an "information technology (information technology, IT) value chain" (vertical axis).

The "intelligent information chain" reflects a series of processes from obtaining data to processing the data. For example, the process may be a general process of intelligent information perception, intelligent information representation and formation, intelligent inference, intelligent decision-making, and intelligent execution and output. In these processes, the data undergoes a refinement process of "data-information-knowledge-intelligence".

The "IT value chain" reflects a value brought by artificial intelligence to the information technology industry from an underlying infrastructure and information (technology providing and processing implementation) of human intelligence to an industrial ecological process of a system.

(1) Infrastructure

The infrastructure provides calculation capability support for the artificial intelligence system, communicates with an external world, and implements supporting by using a basic platform.

The infrastructure can communicate with the outside by using a sensor, and a calculation capability of the infrastructure can be provided by a smart chip.

The smart chip herein may be a hardware acceleration chip such as a central processing unit (central processing unit, CPU), a neural-network processing unit (neural-network processing unit, NPU), a graphics processing unit (graphics processing unit, GPU), an application-specific integrated circuit (application-specific integrated circuit, ASIC), or a field programmable gate array (field programmable gate array, FPGA).

The basic platform of the infrastructure may include related platforms, for example, a distributed computing framework and a network, for assurance and support, including cloud storage and computing, an interconnection network, and the like.

For example, the infrastructure can communicate with the outside by using the sensor, to obtain data, and the data is provided to a smart chip in a distributed computing system provided by the basic platform for computing.

(2) Data

Data at an upper layer of the infrastructure is used to indicate a data source in the field of artificial intelligence. The data relates to a graph, an image, voice, and text, further relates to internet of things data of a conventional device, and includes service data of an existing system and perception data such as force, displacement, a liquid level, a temperature, and humidity.

(3) Data Processing

The foregoing data processing usually includes a processing manner such as data training, machine learning, deep learning, searching, inference, or decision-making.

The machine learning and the deep learning may mean performing symbolic and formalized intelligent information modeling, extraction, preprocessing, training, and the like on data.

Inference is a process in which a human intelligent inference manner is simulated on a computer or in an intelligent system, and machine thinking and problem resolving are performed by using formalized information according to an inference control policy. Atypical function is searching and match.

Decision-making is a process in which a decision is made after intelligent information inference, and usually provides functions such as classification, ranking, and prediction.

(4) General Capability

After data processing mentioned above is performed on data, some general capabilities may be further formed based on a data processing result, for example, an algorithm or a general system, such as translation, text analysis, computer vision processing, speech recognition, and image recognition.

(5) Smart Product and Industry Application

The smart product and the industry application are a product and an application of the artificial intelligence system in various fields, and are package of an overall solution of the artificial intelligence, so that decision-making for smart information is productized and an application is implemented. Application fields mainly include smart manufacturing, smart transportation, smart home, smart health care, smart security protection, autonomous driving, a safe city, a smart terminal, and the like.

The embodiments of this application may be applied to many fields of artificial intelligence, for example, fields such as smart manufacturing, smart transportation, smart home, smart health care, smart security protection, autonomous driving, and a safe city.

Specifically, the embodiments of this application may be applied to fields in which a (deep) neural network needs to be used, for example, image classification, image retrieval, image semantic segmentation, image super-resolution processing, and natural language processing.

The following briefly describes two application scenarios: album image classification and autonomous driving.

Album Image Classification:

Specifically, when a user stores a large quantity of images on a terminal device (for example, a mobile phone) or a cloud disk, recognition of images in an album may help the user or a system perform classification management on the album, thereby improving user experience.

A neural architecture suitable for album classification can be obtained through searching by using a neural architecture search method in this embodiment of this application, and then a neural network is trained based on a training image in a training image library, to obtain an album classification neural network. Then, the album classification neural network may be used to classify images, to label images of different categories, so as to facilitate viewing and searching by the user. In addition, classification labels of the images may also be provided for an album management system to perform classification management. This saves management time of the user, improves album management efficiency, and improves user experience.

Figure 2:
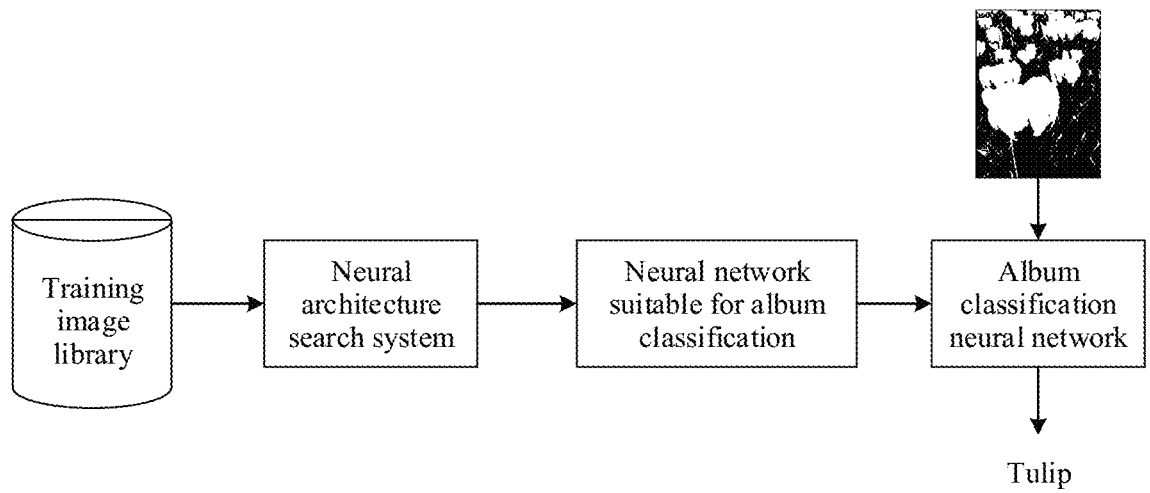
FIG. 2 is a schematic diagram of a specific application according to an embodiment of this application.

For example, as shown in FIG. 2, a neural network suitable for album classification may be established by using a neural architecture search system (corresponding to the neural architecture search method in this embodiment of this application). When the neural network is established, network architectures of construction units in a search network may be optimized by using the training image library, to obtain optimized construction units, and then the neural network is established based on the optimized construction units. After the neural network suitable for album classification is obtained, the neural network may be trained based on the training image, to obtain an album classification neural network. Then, the album classification neural network may be used to classify a to-be-processed image. As shown in FIG. 2, the album classification neural network processes an input image, to obtain that a category of the image is a tulip.

Object recognition in an autonomous driving scenario:

During autonomous driving, a large amount of sensor data needs to be processed, and a deep neural network plays a significant role in autonomous driving with powerful capabilities. However, it is time-consuming and arduous to manually design a corresponding network for data processing. Therefore, a neural network suitable for data processing in the autonomous driving scenario can be established by using the neural architecture search method in this embodiment of this application. Then, the neural network may be trained by using data in the autonomous driving scenario, to obtain a sensor data processing network. Finally, the sensor processing network may be used to process an input road picture, to recognize different objects in the road picture.

Figure 3:
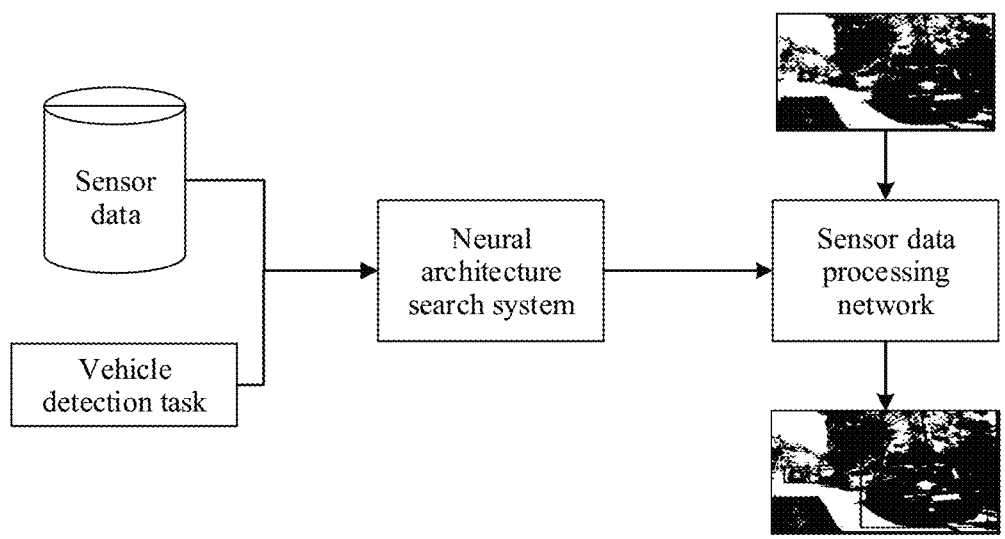
FIG. 3 is a schematic diagram of a specific application according to an embodiment of this application.

As shown in FIG. 3, the neural architecture search system may establish a neural network based on a vehicle detection task. When the neural network is established, network architectures of construction units in a search network may be optimized by using sensor data, to obtain optimized construction units. Then, the neural network is established by using the optimized construction units. After the neural network is obtained, the neural network may be trained based on the sensor data, to obtain the sensor data processing network. Then, the sensor data processing network may be used to process the sensor data. As shown in FIG. 3, the sensor data processing network processes the input road picture, to recognize a vehicle in the road picture (as shown in a rectangular box in a lower-right corner in FIG. 3).

Because the embodiments of this application relate to massive application of a neural network, for ease of understanding, the following describes terms and concepts related to the neural network that may be used in the embodiments of this application.

(1) Neural Network

The neural network may include a neuron. The neuron may be an operation unit that uses $x_s$ and an intercept of 1 as an input, where an output of the operation unit may be as follows:

$$h_{w,b}(x) = f(W^T x) = f(\Sigma_{s=1}^{n} W_s x_s + b) \qquad (1\text{-}1)$$

Herein, s=1, 2, . . . , or n, n is a natural number greater than 1, $W_s$ is a weight of $x_s$, b is a bias of the neuron, and f is an activation function (activation function) of the neuron, used to introduce a non-linear feature into the neural network, to convert an input signal in the neuron into an output signal. The output signal of the activation function may be used as an input of a next convolutional layer, and the activation function may be a sigmoid function. The neural network is a network formed by connecting many single neurons together. To be specific, an output of a neuron may be an input of another neuron. An input of each neuron may be connected to a local receptive field of a previous layer to extract a feature of the local receptive field. The local receptive field may be a region including several neurons.

(2) Deep Neural Network

The deep neural network (deep neural network, DNN) is also referred to as a multi-layer neural network, and may be understood as a neural network with a plurality of hidden layers. The DNN is divided based on locations of different layers, and a neural network in the DNN may be divided into three types: an input layer, a hidden layer, and an output layer. Usually, the first layer is the input layer, the last layer is the output layer, and the middle layer is the hidden layer.

Layers are fully connected. To be specific, any neuron at an $i^{th}$ layer is definitely connected to any neuron at an $(i+1)^{th}$ layer.

Although the DNN seems complex, the DNN is actually not complex in terms of work at each layer, and is simply represented as the following linear relationship expression: $\vec{y}=\alpha(W\cdot\vec{x}+\vec{b})$, where $\vec{x}$ is an input vector, $\vec{y}$ is an output vector, $\vec{b}$ is a bias vector, W is a weight matrix (which is also referred to as a coefficient), and $\Delta(\ )$ is an activation function. At each layer, the output vector $\vec{y}$ is obtained by performing such a simple operation on the input vector z. Because there are a plurality of layers in the DNN, there are also a plurality of coefficients W and a plurality of bias vectors $\vec{b}$. Definitions of the parameters in the DNN are as follows: The coefficient W is used as an example. It is assumed that in a DNN with three layers, a linear coefficient from the fourth neuron at the second layer to the second neuron at the third layer is defined as $W_{24}^3$. The superscript 3 represents a layer at which the coefficient W is located, and the subscript corresponds to an output third-layer index 2 and an input second-layer index 4.

In conclusion, a coefficient from a $k^{th}$ neuron at an $(L-1)^{th}$ layer to a $j^{th}$ neuron at an $L^{th}$ layer is defined as $W_{jk}^L$.

It should be noted that there is no parameter W at the input layer. In the deep neural network, more hidden layers make the network more capable of describing a complex case in the real world. Theoretically, a model with more parameters indicates higher complexity and a larger "capacity", and indicates that the model can be used to complete a more complex learning task. A process of training the deep neural network is a process of learning a weight matrix, and a final objective of training is to obtain weight matrices (weight matrices formed by vectors W at many layers) of all layers of a trained deep neural network.

(3) Convolutional Neural Network

The convolutional neural network (convolutional neuron network, CNN) is a deep neural network with a convolutional architecture. The convolutional neural network includes a feature extractor including a convolution layer and a sub-sampling layer, and the feature extractor may be considered as a filter. The convolutional layer is a neuron layer that is in the convolutional neural network and at which convolution processing is performed on an input signal. At the convolutional layer of the convolutional neural network, one neuron may be connected only to some adjacent-layer neurons. One convolutional layer usually includes several feature planes, and each feature plane may include some neurons arranged in a rectangular form. Neurons on a same feature plane share a weight, where the shared weight is a convolution kernel. Weight sharing may be understood as that an image information extraction manner is irrelevant to a location. The convolution kernel may be initialized in a form of a random-size matrix. In a process of training the convolutional neural network, the convolution kernel may obtain an appropriate weight through learning. In addition, a direct benefit brought by weight sharing is that connections between layers of the convolutional neural network are reduced and an overfitting risk is lowered.

(4) Recurrent Neural Network

The recurrent neural network (recurrent neural networks, RNN) is used to process sequence data. In a conventional neural network model, from an input layer to a hidden layer and then to an output layer, the layers are fully connected, and nodes at each layer are not connected. Such a common neural network resolves many problems, but is still incapable of resolving many other problems. For example, if a word in a sentence is to be predicted, a previous word usually needs to be used, because adjacent words in the sentence are related. A reason why the RNN is referred to as the recurrent neural network is that a current output of a sequence is also related to a previous output of the sequence. A specific representation form is that the network memorizes previous information and applies the previous information to calculation of the current output. To be specific, nodes at the hidden layer are connected, and an input of the hidden layer not only includes an output of the input layer, but also includes an output of the hidden layer at a previous moment. Theoretically, the RNN can process sequence data of any length. Training for the RNN is the same as training for a conventional CNN or DNN.

Now that there is a convolutional neural network, why is the recurrent neural network required? A reason is simple. In the convolutional neural network, it is assumed that elements are independent of each other, and an input and an output are also independent, such as a cat and a dog. However, in the real world, many elements are interconnected. For example, stocks change with time. For another example, a person says: I like traveling, and my favorite place is Yunnan. I will go if there is a chance. Herein, people should know that the person will go to "Yunnan". A reason is that the people can deduce the answer based on content of the context. However, how can a machine do this? The RNN emerges. The RNN is intended to make the machine capable of memorizing like a human. Therefore, an output of the RNN needs to depend on current input information and historical memorized information.

(5) Loss Function

In a process of training a deep neural network, because it is expected that an output of the deep neural network is as close as possible to a value that is actually expected to be predicted, a current predicted value of the network may be compared with a target value that is actually expected, and then a weight vector at each layer of the neural network is updated based on a difference between the current predicted value and the target value (there is usually an initialization process before the first update, that is, a parameter is preconfigured for each layer of the deep neural network). For example, if the predicted value of the network is large, the weight vector is adjusted to lower the predicted value until the deep neural network can predict the target value that is actually expected or a value close to the target value that is actually expected. Therefore, "how to obtain, through comparison, the difference between the predicted value and the target value" needs to be predefined. This is the loss function (loss function) or an objective function (objective function). The loss function and the objective function are important equations used to measure the difference between the predicted value and the target value. The loss function is used as an example. A higher output value (loss) of the loss function indicates a larger difference. Therefore, training of the deep neural network is a process of minimizing the loss as much as possible.

(6) Back Propagation Algorithm

A neural network may use an error back propagation (back propagation, BP) algorithm to correct a value of a parameter in an initial neural network model in a training process, so that a reconstruction error loss of the neural network model becomes smaller. Specifically, an input signal is transferred forward until an error loss occurs at an output, and the parameter in the initial neural network model is updated based on back propagation error loss information, to make the error loss converge. The back propagation algorithm is an error-loss-centered back propagation motion intended to obtain a parameter, such as a weight matrix, of an optimal neural network model.

Figure 4:
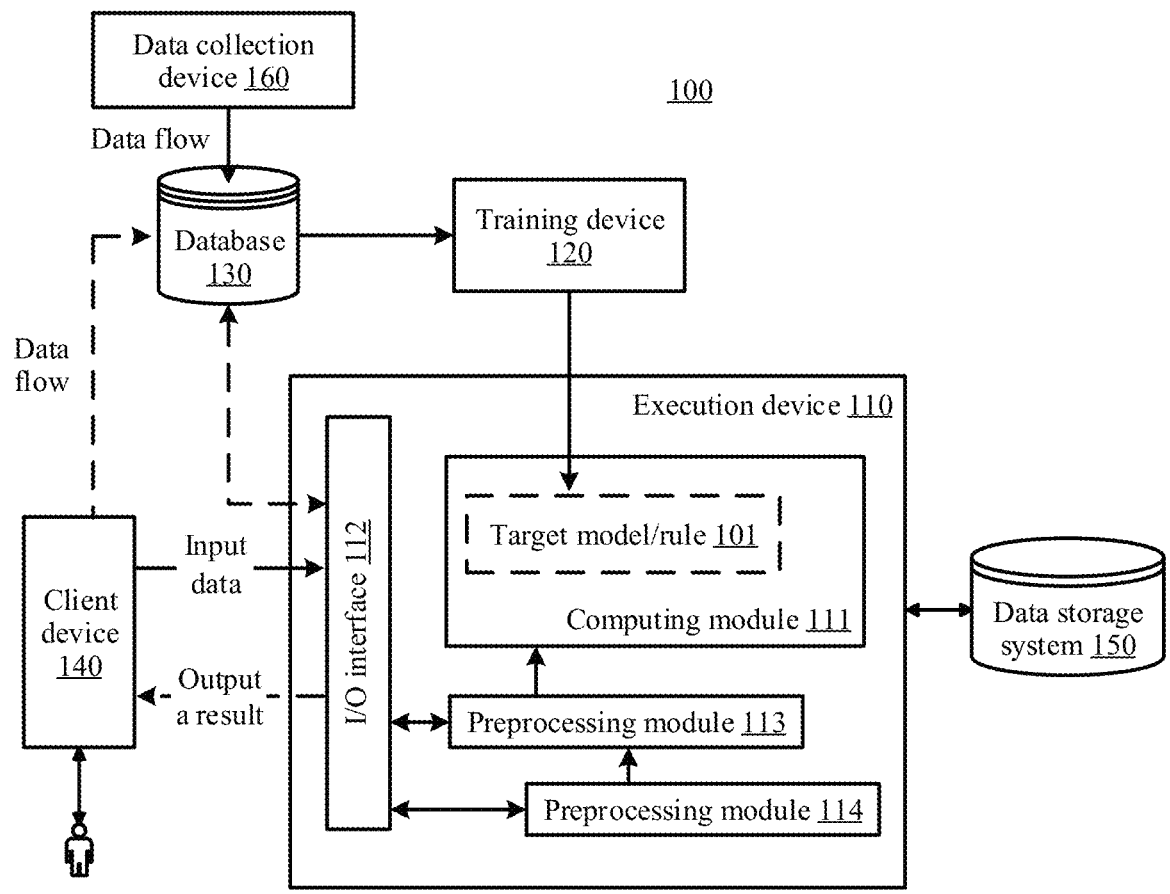
FIG. 4 is a schematic structural diagram of a system architecture according to an embodiment of this application.

FIG. 4 shows a system architecture 100 according to an embodiment of this application. In FIG. 4, a data collection device 160 is configured to collect training data. For an image processing method in this embodiment of this application, the training data may include a training image and a classification result corresponding to the training image, and the result corresponding to the training image may be a result of manual pre-labeling.

After collecting the training data, the data collection device 160 stores the training data in a database 130, and a training device 120 obtains a target model/rule 101 through training based on the training data maintained in the database 130.

The following describes the target model/rule 101 obtained by the training device 120 based on the training data. The training device 120 processes an input original image, and compares an output image with the original image until a difference between the image output by the training device 120 and the original image is less than a specific threshold. In this way, training of the target model/rule 101 is completed.

The target model/rule 101 can be used to implement the image processing method in this embodiment of this application. The target model/rule 101 in this embodiment of this application may specifically be a neural network. It should be noted that, in an actual application, the training data maintained in the database 130 is not necessarily all collected by the data collection device 160, and may be received from another device. In addition, it should be noted that the training device 120 does not necessarily perform training completely based on the training data maintained in the database 130 to obtain the target model/rule 101, but may obtain training data from a cloud or another place to perform model training. The foregoing description shall not constitute any limitation on this embodiment of this application.

The target model/rule 101 obtained through training by the training device 120 may be applied to different systems or devices, for example, an execution device 110 shown in FIG. 4. The execution device 110 may be a terminal, for example, a mobile phone terminal, a tablet, a laptop computer, an augmented reality (augmented reality, AR)/virtual reality (virtual reality, VR) terminal, or a vehicle-mounted terminal, or may be a server, a cloud, or the like. In FIG. 4, the execution device 110 configures an input/output (input/output, I/O) interface 112, configured to exchange data with an external device. A user may input data to the I/O interface 112 by using a client device 140, where the input data in this embodiment of this application may include a to-be-processed image input by the client device.

A preprocessing module 113 and a preprocessing module 114 are configured to perform preprocessing based on the input data (for example, the to-be-processed image) received by the I/O interface 112. In this embodiment of this application, the preprocessing module 113 and the preprocessing module 114 may not exist (or only one of the preprocessing module 113 and the preprocessing module 114 exists). A computing module 111 is directly configured to process the input data.

In a process in which the execution device 110 preprocesses the input data, or in a process in which the computing module 111 of the execution device 110 performs computing, the execution device 110 may invoke data, code, and the like in a data storage system 150 for corresponding processing, and may further store, in the data storage system 150, data, an instruction, and the like that are obtained through the corresponding processing.

Finally, the I/O interface 112 returns a processing result, such as an image obtained through denoising, to the client device 140, to provide the image to the user.

It should be noted that the training device 120 may generate corresponding target models/rules 101 for different targets or different tasks based on different training data. The corresponding target models/rules 101 may be used to implement the foregoing targets or complete the foregoing tasks, to provide a desired result for the user.

In a case shown in FIG. 4, the user may manually input data and the user may input the data on an interface provided by the I/O interface 112. In another case, the client device 140 may automatically send input data to the I/O interface 112. If it is required that the client device 140 needs to obtain authorization from the user to automatically send the input data, the user may set corresponding permission on the client device 140. The user may view, on the client device 140, a result output by the execution device 110. Specifically, the result may be presented in a form of displaying, a sound, an action, or the like. The client device 140 may alternatively be used as a data collection end, to collect, as new sample data, input data that is input to the I/O interface 112 and an output result that is output from the I/O interface 112 that are shown in the figure, and store the new sample data in the database 130. It is clear that the client device 140 may alternatively not perform collection. Instead, the I/O interface 112 directly stores, in the database 130 as new sample data, the input data that is input to the I/O interface 112 and the output result that is output from the I/O interface 112 in the figure.

It should be noted that FIG. 4 is merely a schematic diagram of the system architecture according to an embodiment of this application. A location relationship between a device, a component, a module, and the like shown in the figure constitutes no limitation. For example, in FIG. 4, the data storage system 150 is an external memory relative to the execution device 110. In another case, the data storage system 150 may alternatively be disposed in the execution device 110.

As shown in FIG. 4, the target model/rule 101 is obtained through training by the training device 120. The target model/rule 101 may be a neural network in this embodiment of this application. Specifically, the neural network provided in this embodiment of this application may be a CNN, a deep convolutional neural network (deep convolutional neural network, DCNN), a recurrent neural network (recurrent neural network, RNN), or the like.

Figure 5:
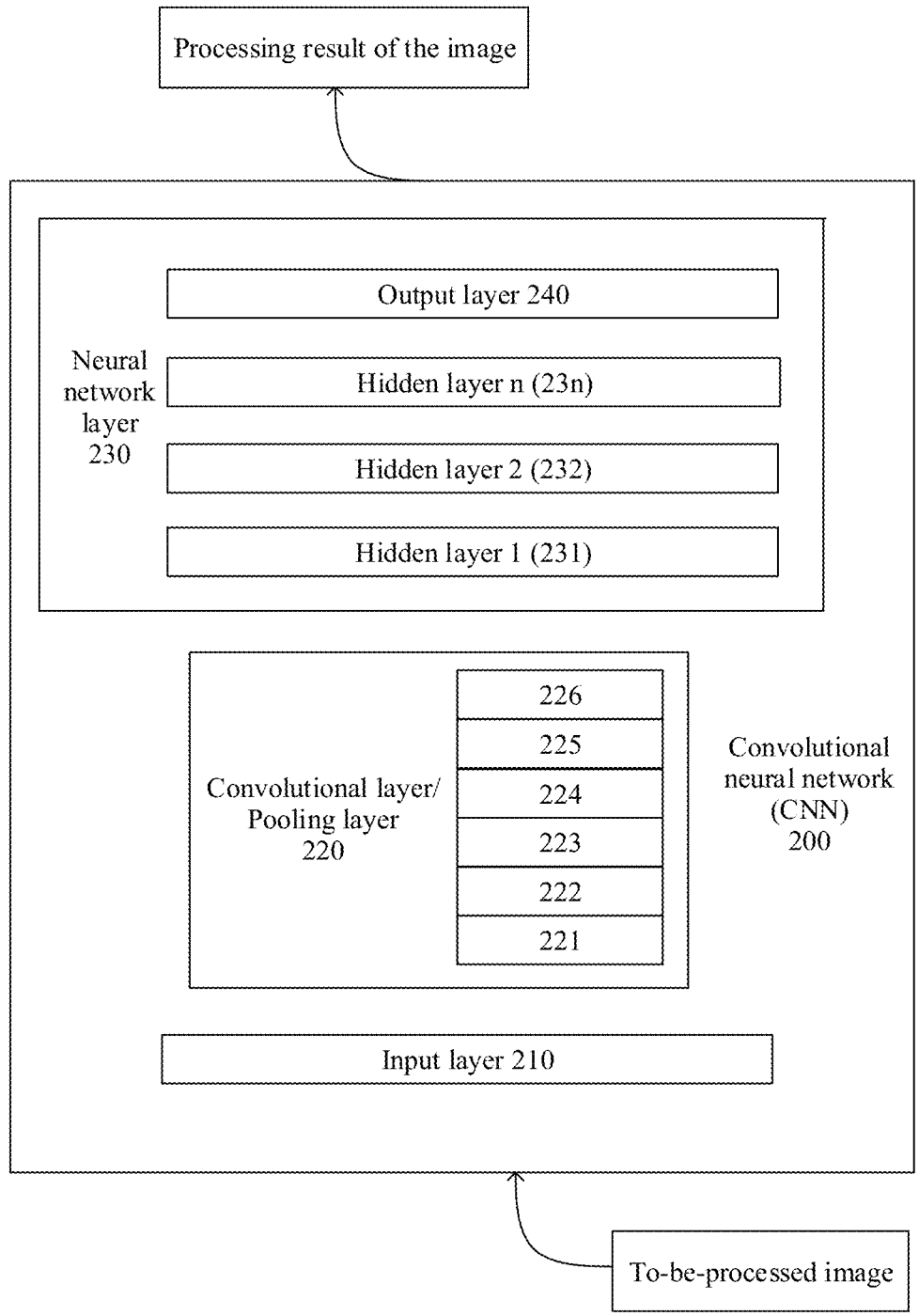
FIG. 5 is a schematic structural diagram of a convolutional neural network according to an embodiment of this application.

Because the CNN is a common neural network, the following mainly describes an architecture of the CNN in detail with reference to FIG. 5. As described in the foregoing basic concepts, a convolutional neural network is a deep neural network with a convolutional architecture, and is a deep learning (deep learning) architecture. In the deep learning architecture, multi-layer learning is performed at different abstract levels by using a machine learning algorithm. As a deep learning architecture, the CNN is a feed-forward (feed-forward) artificial neural network. Neurons in the feed-forward artificial neural network may respond to an input picture.

An architecture of a neural network specifically used in the image processing method in this embodiment of this application may be shown in FIG. 5. In FIG. 5, a convolutional neural network (CNN) 200 may include an input layer 210, a convolutional layer/pooling layer 220 (the pooling layer is optional), and a neural network layer 230. The input layer 210 may obtain a to-be-processed image, and send the obtained to-be-processed image to the convolutional layer/pooling layer 220 and the subsequent neural network layer 230 for processing, to obtain a processing result of the image. The following describes in detail an architecture of the layer in the CNN 200 in FIG. 5.

Convolutional Layer/Pooling Layer 220:

Convolutional Layer:

As shown in FIG. 5, for example, the convolutional layer/pooling layer 220 may include layers 221 to 226. In an implementation, the layer 221 is a convolutional layer, the layer 222 is a pooling layer, the layer 223 is a convolutional layer, the layer 224 is a pooling layer, the layer 225 is a convolutional layer, and the layer 226 is a pooling layer. In another implementation, the layer 221 and the layer 222 are convolutional layers, the layer 223 is a pooling layer, the layer 224 and the layer 225 are convolutional layers, and the layer 226 is a pooling layer. To be specific, an output of a convolutional layer may be used as an input of a subsequent pooling layer, or may be used as an input of another convolutional layer to continue to perform a convolution operation.

The following uses the convolutional layer 221 as an example to describe an internal working principle of one convolutional layer.

The convolutional layer 221 may include a plurality of convolution operators. The convolution operator is also referred to as a kernel. In image processing, the convolution operator functions as a filter that extracts specific information from an input image matrix. The convolution operator may essentially be a weight matrix, and the weight matrix is usually predefined. In a process of performing a convolution operation on an image, the weight matrix usually processes pixels at a granularity level of one pixel (or two pixels, depending on a value of a stride (stride)) in a horizontal direction on an input image, to extract a specific feature from the image. A size of the weight matrix should be related to a size of the image. It should be noted that a depth dimension (depth dimension) of the weight matrix is the same as a depth dimension of the input image. During a convolution operation, the weight matrix extends to an entire depth of the input image. Therefore, a convolutional output of a single depth dimension is generated through convolution with a single weight matrix. However, in most cases, a single weight matrix is not used, but a plurality of weight matrices with a same size (rows×columns), namely, a plurality of same-type matrices, are applied. Outputs of the weight matrices are superimposed to form a depth dimension of a convolutional image. The dimension herein may be understood as being determined based on the foregoing "plurality". Different weight matrices may be used to extract different features from the image. For example, one weight matrix is used to extract edge information of the image, another weight matrix is used to extract a specific color of the image, and a further weight matrix is used to blur unneeded noise in the image. The plurality of weight matrices have the same size (rows×columns), and convolutional feature maps extracted from the plurality of weight matrices with the same size have a same size. Then, the plurality of extracted convolutional feature maps with the same size are combined to form an output of the convolution operation.

Weight values in these weight matrices need to be obtained through a lot of training during actual application. Each weight matrix formed by using the weight values obtained through training may be used to extract information from an input image, to enable the convolutional neural network 200 to perform correct prediction.

When the convolutional neural network 200 has a plurality of convolutional layers, a relatively large quantity of general features are usually extracted at an initial convolutional layer (for example, 221). The general feature may also be referred to as a low-level feature. As the depth of the convolutional neural network 200 increases, a feature extracted at a subsequent convolutional layer (for example, 226) becomes more complex, for example, a high-level semantic feature. A feature with higher semantics is more applicable to a to-be-resolved problem.

Pooling Layer:

Because a quantity of training parameters usually needs to be reduced, a pooling layer usually needs to be periodically introduced after a convolutional layer. To be specific, for the layers 221 to 226 in the layer 220 shown in FIG. 5, one convolutional layer may be followed by one pooling layer, or a plurality of convolutional layers may be followed by one or more pooling layers. During image processing, the pooling layer is only used to reduce a space size of the image. The pooling layer may include an average pooling operator and/or a maximum pooling operator, to perform sampling on the input image to obtain an image with a relatively small size. The average pooling operator may be used to calculate pixel values in the image in a specific range, to generate an average value. The average value is used as an average pooling result. The maximum pooling operator may be used to select a pixel with a maximum value in a specific range as a maximum pooling result. In addition, similar to that the size of the weight matrix at the convolutional layer needs to be related to the size of the image, an operator at the pooling layer also needs to be related to the size of the image. A size of a processed image output from the pooling layer may be less than a size of an image input to the pooling layer. Each pixel in the image output from the pooling layer represents an average value or a maximum value of a corresponding sub-region of the image input to the pooling layer.

Neural Network Layer 230:

After processing performed at the convolutional layer/pooling layer 220, the convolutional neural network 200 is not ready to output required output information. As described above, at the convolutional layer/pooling layer 220, only a feature is extracted, and parameters resulting from an input image are reduced. However, to generate final output information (required class information or other related information), the convolutional neural network 200 needs to use the neural network layer 230 to generate an output of one required class or outputs of a group of required classes. Therefore, the neural network layer 230 may include a plurality of hidden layers (231, 232, . . . , and 23$n$ shown in FIG. 5) and an output layer 240. Parameters included in the plurality of hidden layers may be obtained through pre-training based on related training data of a specific task type. For example, the task type may include image recognition, image classification, super-resolution image reconstruction, and the like.

At the neural network layer 230, the plurality of hidden layers are followed by the output layer 240, namely, the last layer of the entire convolutional neural network 200. The output layer 240 has a loss function similar to a categorical cross entropy, and the loss function is specifically configured to calculate a prediction error. Once forward propagation (for example, propagation in a direction from 210 to 240 in FIG. 5) of the entire convolutional neural network 200 is completed, back propagation (for example, propagation in a direction from 240 to 210 in FIG. 5) is started to update a weight value and a deviation of each layer mentioned above, to reduce a loss of the convolutional neural network 200 and an error between a result output by the convolutional neural network 200 by using the output layer and an ideal result.

Figure 6:
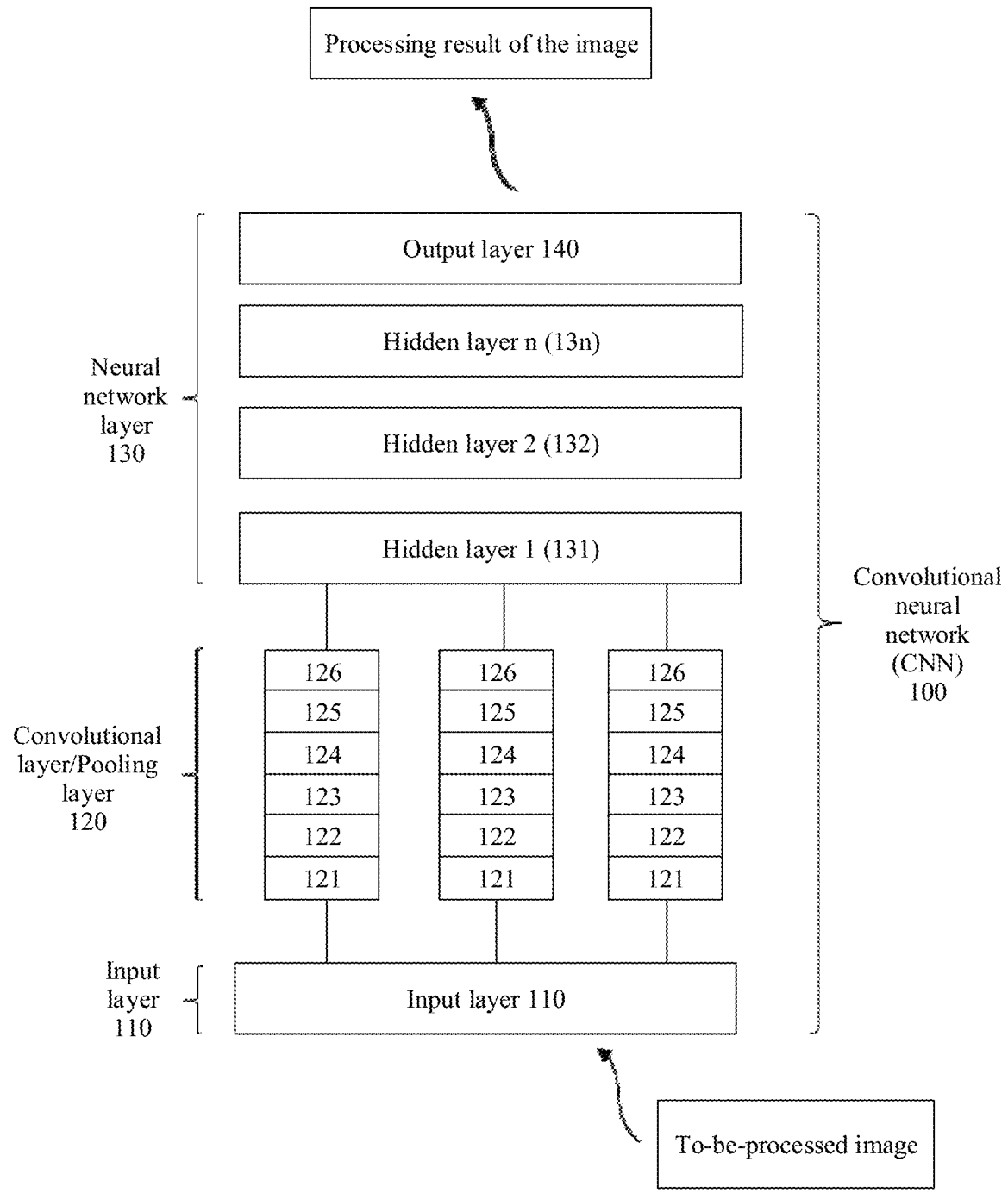
FIG. 6 is a schematic structural diagram of a convolutional neural network according to an embodiment of this application.

An architecture of a neural network specifically used in the image processing method in this embodiment of this application may be shown in FIG. 6. In FIG. 6, a convolutional neural network (CNN) 200 may include an input layer 110, a convolutional layer/pooling layer 120 (the pooling layer is optional), and a neural network layer 130. Compared with FIG. 5, in FIG. 6, at the convolutional layer/pooling layer 120, a plurality of convolutional layers/pooling layers are in parallel, and extracted features are input to the neural network layer 130 for processing.

It should be noted that the convolutional neural network shown in FIG. 5 and the convolutional neural network shown in FIG. 6 are merely two example convolutional neural networks used in the image processing method in this embodiment of this application. In a specific application, the convolutional neural network used in the image processing method in this embodiment of this application may alternatively exist in a form of another network model.

In addition, an architecture of a convolutional neural network obtained by using the neural architecture search method in this embodiment of this application may be shown in the architecture of the convolutional neural network in FIG. 5 and the architecture of the convolutional neural network FIG. 6.

Figure 7:
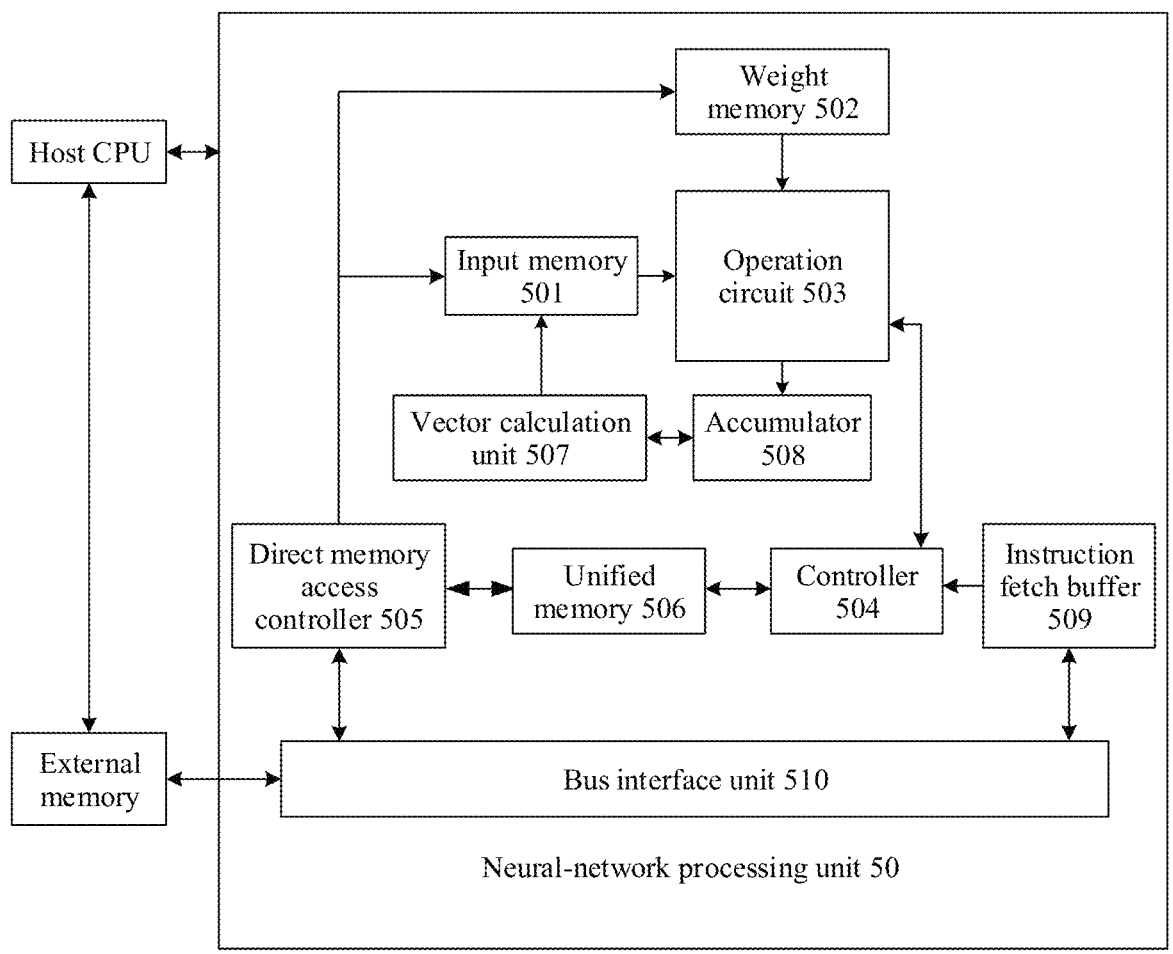
FIG. 7 is a schematic diagram of a hardware architecture of a chip according to an embodiment of this application.

FIG. 7 is a schematic diagram of a hardware architecture of a chip according to an embodiment of this application. The chip includes a neural-network processing unit 50. The chip may be disposed in the execution device 110 shown in FIG. 4, to complete computing work of the computing module 111. The chip may alternatively be disposed in the training device 120 shown in FIG. 4, to complete training work of the training device 120 and output the target model/rule 101. Algorithms at all layers of the convolutional neural network shown in FIG. 5 or the convolutional neural network shown in FIG. 6 may be implemented in the chip shown in FIG. 7.

The neural-network processing unit NPU 50 serves as a coprocessor, and may be disposed on a host central processing unit (central processing unit, CPU) (host CPU). The host CPU assigns a task. A core part of the NPU is an operation circuit 50, and a controller 504 controls the operation circuit 503 to extract data in a memory (a weight memory or an input memory) and perform an operation.

In some implementations, the operation circuit 503 includes a plurality of process engine (process engine, PE) inside. In some implementations, the operation circuit 503 is a two-dimensional systolic array. The operation circuit 503 may alternatively be a one-dimensional systolic array or another electronic circuit capable of performing mathematical operations such as multiplication and addition. In some implementations, the operation circuit 503 is a general-purpose matrix processor.

For example, it is assumed that there are an input matrix A, a weight matrix B, and an output matrix C. The operation circuit fetches, from a weight memory 502, data corresponding to the matrix B, and caches the data on each PE in the operation circuit. The operation circuit fetches data of the matrix A from an input memory 501, to perform a matrix operation on the matrix B, and stores an obtained partial result or an obtained final result of the matrix in an accumulator (accumulator) 508.

A vector calculation unit 507 may perform further processing such as vector multiplication, vector addition, an exponent operation, a logarithm operation, or value comparison on an output of the operation circuit. For example, the vector calculation unit 507 may be configured to perform network calculation, such as pooling (pooling), batch normalization (batch normalization), or local response normalization (local response normalization) at a non-convolutional/non-FC layer in a neural network.

In some implementations, the vector calculation unit 507 can store a processed output vector in a unified cache 506. For example, the vector calculation unit 507 can apply a non-linear function to an output of the operation circuit 503, for example, a vector of an accumulated value, used to generate an activated value. In some implementations, the vector calculation unit 507 generates a normalized value, a combined value, or both a normalized value and a combined value. In some implementations, the processed output vector can be used as an activated input to the operation circuit 503, for example, the processed output vector can be used at a subsequent layer of the neural network.

The unified memory 506 is configured to store input data and output data.

For weight data, a direct memory access controller (direct memory access controller, DMAC) 505 directly transfers input data in an external memory to the input memory 501 and/or the unified memory 506, stores weight data in the external memory in the weight memory 502, and stores data in the unified memory 506 in the external memory.

A bus interface unit (bus interface unit, BIU) 510 is configured to implement interaction between the host CPU, the DMAC, and an instruction fetch buffer 509 by using a bus.

The instruction fetch buffer (instruction fetch buffer) 509 connected to the controller 504 is configured to store an instruction used by the controller 504.

The controller 504 is configured to invoke the instruction cached in the instruction fetch buffer 509, to control a working process of an operation accelerator.

Entry: Data herein may be described as description data according to an actual application, for example, a detected vehicle speed, a distance to an obstacle, and the like.

Usually, the unified memory 506, the input memory 501, the weight memory 502, and the instruction fetch buffer 509 each are an on-chip (On-Chip) memory. The external memory is a memory outside the NPU. The external memory may be a double data rate synchronous dynamic random access memory (double data rate synchronous dynamic random access memory, DDR SDRAM for short), a high bandwidth memory (high bandwidth memory, HBM), or another readable and writable memory.

An operation of each layer in the convolutional neural network shown in FIG. 5 or the convolutional neural network FIG. 6 may be performed by the operation circuit 303 or the vector calculation unit 307.

The execution device 110 in FIG. 4 can perform steps of the image processing method in this embodiment of this application. The CNN model shown in FIG. 5 and the CNN model shown in FIG. 6 and the chip shown in FIG. 7 may also be configured to perform the steps of the image processing method in this embodiment of this application. The following describes the image processing method according to an embodiment of this application in detail with reference to the accompanying drawings.

Figure 8:
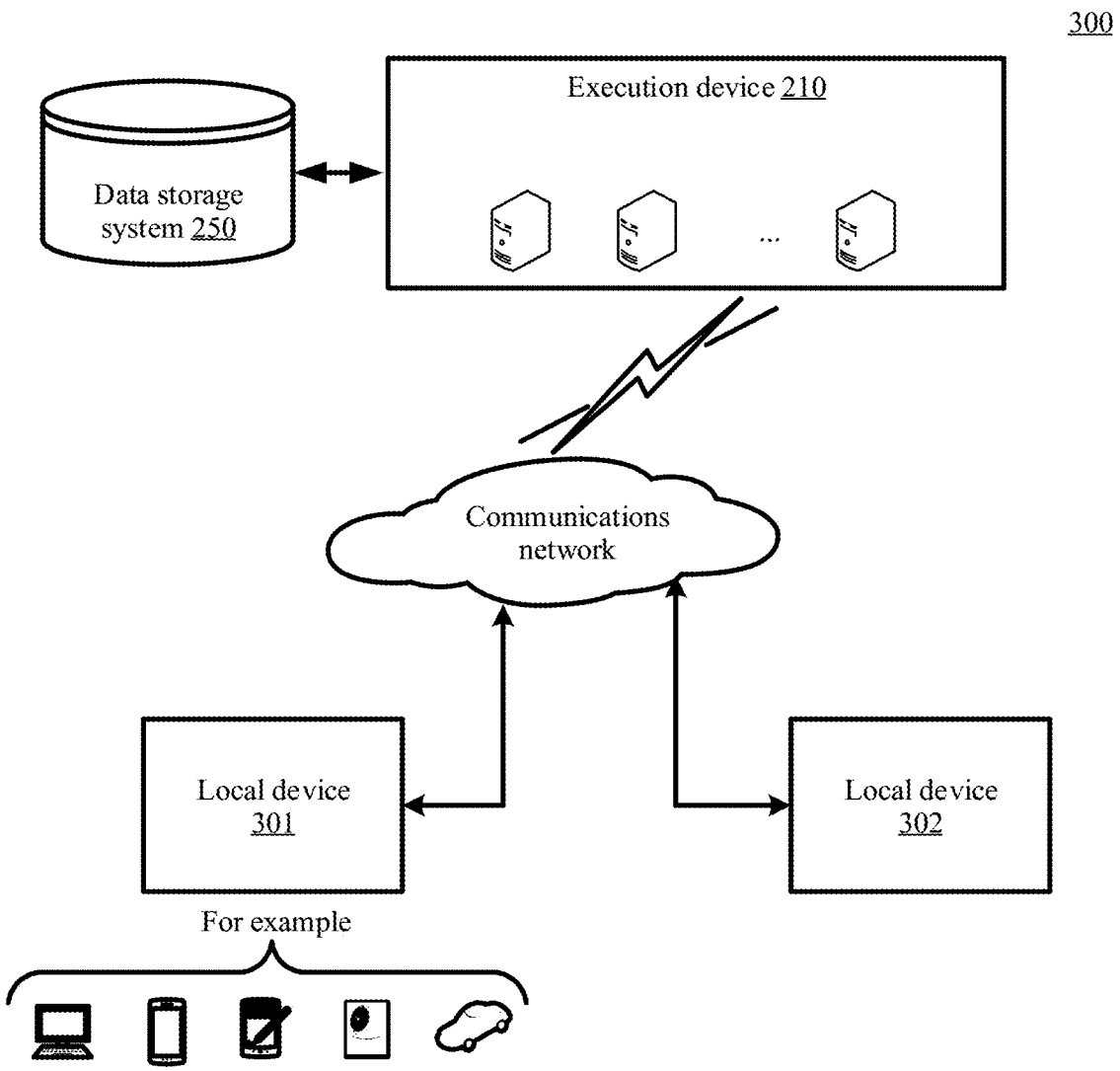
FIG. 8 is a schematic diagram of a system architecture according to an embodiment of this application.

FIG. 8 shows a system architecture 300 according to an embodiment of this application. The system architecture includes a local device 301, a local device 302, an execution device 210, and a data storage system 250. The local device 301 and the local device 302 are connected to the execution device 210 by using a communications network.

The execution device 210 may be implemented by one or more servers. Optionally, the execution device 210 may cooperate with another computing device, for example, a device such as a data memory, a router, or a load balancer. The execution device 210 may be disposed on one physical site, or distributed on a plurality of physical sites. The execution device 210 may implement the neural architecture search method in this embodiment of this application by using data in the data storage system 250 or by invoking program code in the data storage system 250.

Specifically, the execution device 210 may be configured to: determine search space and a plurality of construction units; superimpose the plurality of construction units to obtain a search network, where the search network is a neural network used to search for a neural architecture; optimize, in the search space, network architectures of the construction units in the search network, to obtain optimized construction units, where in an optimizing process, the search space gradually decreases, and a quantity of construction units gradually increases, so that a video random access memory resource consumed in an optimizing process falls within a preset range; and establish a target neural network based on the optimized construction units.

The execution device 210 may establish the target neural network through the foregoing process, and the target neural network may be used for image classification, image processing, or the like.

A user may operate user equipment (for example, the local device 301 and the local device 302) to interact with the execution device 210. Each local device may be any computing device, such as a personal computer, a computer workstation, a smartphone, a tablet computer, an intelligent camera, a smart automobile, another type of cellular phone, a media consumption device, a wearable device, a set-top box, or a game console.

The local device of each user may interact with the execution device 210 through a communications network of any communications mechanism/communications standard. The communications network may be a wide area network, a local area network, a point-to-point connection, or any combination thereof.

In an implementation, the local device 301 and the local device 302 obtain a related parameter of the target neural network from the execution device 210, deploy the target neural network on the local device 301 and the local device 302, and perform image classification, image processing, or the like by using the target neural network.

In another implementation, the target neural network may be directly deployed on the execution device 210. The execution device 210 obtains a to-be-processed image from the local device 301 and the local device 302, and performs classification or another type of image processing on the to-be-processed image based on the target neural network.

The execution device 210 may also be referred to as a cloud device. In this case, the execution device 210 is usually deployed on a cloud.

Figure 9:
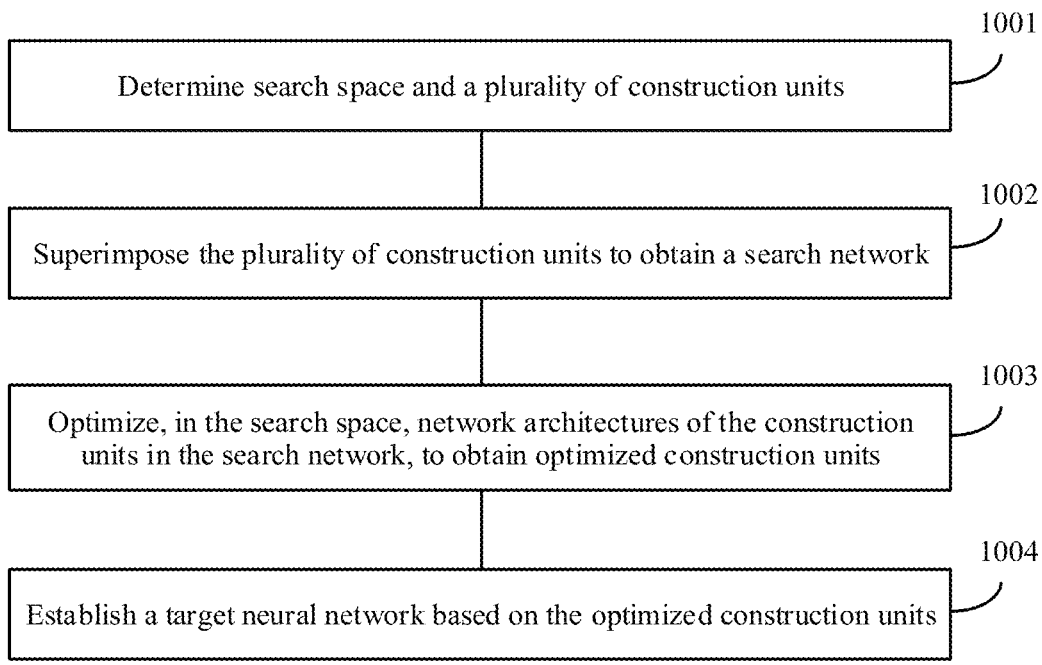
FIG. 9 is a schematic flowchart of a neural architecture search method according to an embodiment of this application.

The following describes in detail a neural architecture search method according to an embodiment of this application with reference to FIG. 9. The method shown in FIG. 9 may be performed by using a neural architecture search apparatus. The neural architecture search apparatus may be a device that has a computing capability to implement neural architecture searching, for example, a computer, a server, or a cloud device.

The method shown in FIG. 9 includes step 1001 to step 1004. The following describes the steps in detail.

1001: Determine search space and a plurality of construction units.

Optionally, the search space is determined based on an application requirement of a to-be-established target neural network.

In other words, the search space may be determined based on an application requirement of a target neural network. Specifically, the search space may be determined based on a type of data that needs to be processed by the target neural network.

Usually, types and a quantity of operations included in the search space needs to match the application requirement of the target neural network. When the target neural network is used to process image data, the types and the quantity of operations included in the search space need to adapt to image data processing. When the target neural network is used to process voice data, the types and the quantity of operations included in the search space need to adapt to voice data processing.

For example, when the target neural network is a neural network used to process image data, the search space may include a convolution operation, a pooling operation, a skip connection (skip connect) operation, and the like.

For another example, when the target neural network is a neural network used to process voice data, the search space may include an activation function (for example, ReLU or Tanh) and the like.

Optionally, the search space is determined based on an application requirement of the target neural network and a condition of a video random access memory resource of a device performing neural architecture searching.

The condition of the video random access memory resource of the device performing neural architecture searching may be a size of the video random access memory resource of the device performing neural architecture searching.

In other words, in this application, the search space may be determined based on the application requirement of the target neural network and the condition of the video random access memory resource of the device performing neural architecture searching.

Specifically, the types and the quantity of operations included in the search space may be first determined based on the application requirement of the target neural network, and then the types and the quantity of operations included in the search space are adjusted based on the condition of the video random access memory resource of the device performing neural architecture search, to determine types and a quantity of operations finally included in the search space.

For example, after the types and the quantity of operations included in the search space are determined based on the application requirement of the target neural network, if there are relatively few video random access memory resources of the device performing neural architecture searching, some operations that are less important in the search space may be deleted. If there are relatively sufficient video random access memory resources of the device performing neural architecture searching, the types and the quantity of operations included in the search space may remain unchanged, or the types and the quantity of operations included in the search space are increased.

Optionally, the quantity of construction units is determined based on the condition of the video random access memory resource of the device performing neural architecture searching.

Specifically, the quantity of construction units may be determined based on a size of the video random access memory resource of the device performing neural architecture searching. When there are relatively sufficient video random access memory resources of the device performing neural architecture searching, the quantity of construction units may be large. When there are relatively few video random access memory resources of the device performing neural architecture searching, the quantity of construction units may be few.

The quantity of construction units may alternatively be set based on experience. For example, the quantity of construction units that usually need to be superimposed to form a search network may be determined based on experience.

Each of the plurality of construction units may be a network architecture obtained by connecting a plurality of nodes by using a basic operation of a neural network. The construction unit is a basic module configured to establish a neural network, and the neural network may be established by using the construction unit.

Figure 10:
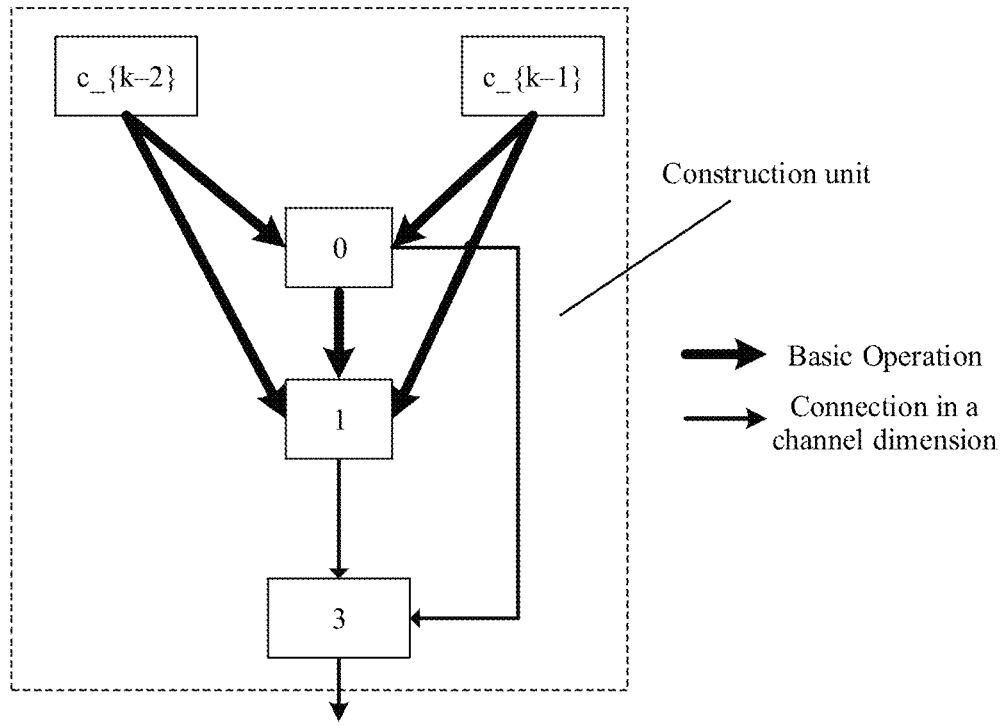
FIG. 10 is a schematic diagram of a construction unit according to an embodiment of this application.

The following briefly describes an architecture of the construction unit in this embodiment of this application with reference to FIG. 10. It should be understood that the construction unit shown in FIG. 10 is merely a possible construction unit, and the construction unit shown in FIG. 10 does not constitute any limitation on an architecture of the construction unit in this application.

As shown in FIG. 10, the construction unit may include a node c_{k−2}, a node c_{k−1}, a node 0, a node 1, and a node 2, where the node c_{k−2} and the node c_{k−1} are input nodes, the node 0 and the node 1 are intermediate nodes, and the node 2 is an output node. The construction unit shown in FIG. 10 may receive data output by the node c_{k−2} and the node c_{k−1}, and the node 0 and the node 1 respectively process the input data. Data output by the node 0 is further input to the node 1 for processing, data output by the node 0 and the node 1 is sent to the node 2 for processing, and the node 2 finally outputs data processed by the construction unit.

In FIG. 10, each node may represent a feature map. A thick arrow in FIG. 10 represents one or more basic operations, operation results of the basic operations that are incorporated into a same intermediate node are added at the intermediate node. A thin arrow in FIG. 10 represents a feature map connection in a channel dimension, and a feature map output by the output node 2 is formed by sequentially connecting outputs of two intermediate nodes (the node 0 and the node 1) in the channel dimension of the feature map.

It should be understood that operations corresponding to the thick arrow and the thin arrow in FIG. 10 should be operations related to a specific case. Addition and the connection in the channel dimension herein are both designed for a convolutional neural network. In another case, an operation corresponding to nodes of the construction unit may alternatively be another type of operation.

The search space may include preset basic operations or a combination of basic operations in the convolutional neural network, where the basic operations or the combination of basic operations may be collectively referred to as a basic operation.

The search space may include the following eight basic operations:

(1) average pooling (avg_pool_3×3) with a pooling kernel size of 3×3;

(2) maximum pooling (max_pool_3×3) with a pooling kernel size of 3×3;

(3) separable convolution (sep_conv_3×3) with a convolution kernel size of 3×3;

(4) separable convolution (sep_conv_5×5) with a convolution kernel size of 5×5;

(5) dilated convolution (dil_conv_3×3) with a convolution kernel size of 3×3 and a dilation rate of 2;

(6) dilated convolution (dil_conv_5×5) with a convolution kernel size of 5×5 and a dilation rate of 2;

(7) skip connection operation; and (8) zero operation (Zero, each neuron at a corresponding position is set to zero).

1002: Superimpose the plurality of construction units to obtain the search network.

The search network in step 1002 may be a neural network used to search for a neural architecture.

Optionally, that the plurality of construction units are superimposed to obtain the search network includes: sequentially superimposing the plurality of construction units in a preset superimposing manner to obtain the search network, where in the search network, an output of a previous construction unit is an input of a next construction unit.

The foregoing preset superimposing manner may indicate a type of construction unit, a location of a construction unit, a quantity of superimposed construction units of each type, or the like.

1003: Optimize, in the search space, network architectures of the construction units in the search network, to obtain optimized construction units.

In each of the plurality of construction units, some channels of an output feature map of each node are processed by using a to-be-selected operation, to obtain a processed feature map. An input feature map of a next node of each node is a feature map obtained by stitching the processed feature map and a remaining feature map that is of each node and that is not processed by using the to-be-selected operation.

The next node of each node may be a node that is connected to each node and to which the feature map obtained after some channels of the output feature map of each node are processed by using the to-be-selected operation is input.

Specifically, in each construction unit, the output feature map of each node has c channels, c/K channels of the output feature map of each node are processed by using the to-be-selected operation, to obtain the processed feature map, and the input feature map of the next node of each node is a feature map obtained by stitching the processed feature map and the remaining feature map.

The processed feature map has c/K channels, the remaining feature map has c×(K−1)/K channels, the remaining feature map is a feature map that is output by each node and that is not processed by using the to-be-selected operation, c and K are both integers greater than 1, and the to-be-selected operation includes all operations in the search space.

In this application, in each of the plurality of construction units, only some channels of the output feature map of each node are processed by using the to-be-selected operation, and the processed feature map and the remaining feature map are stitched and input to the next node of each node as an input feature map of the next node.

For example, one construction unit includes a first node and a second node, and the second node is a next node of the first node. An output feature map of the first node has c channels, and c/K channels of the output feature map of the first node are processed by using the to-be-selected operation, to obtain a processed feature map. An input feature map of the second node is a feature map obtained by stitching the processed feature map and a remaining feature map, and the remaining feature map is a feature map that is output by the first node and that is not processed by using the to-be-selected operation.

Figure 11:
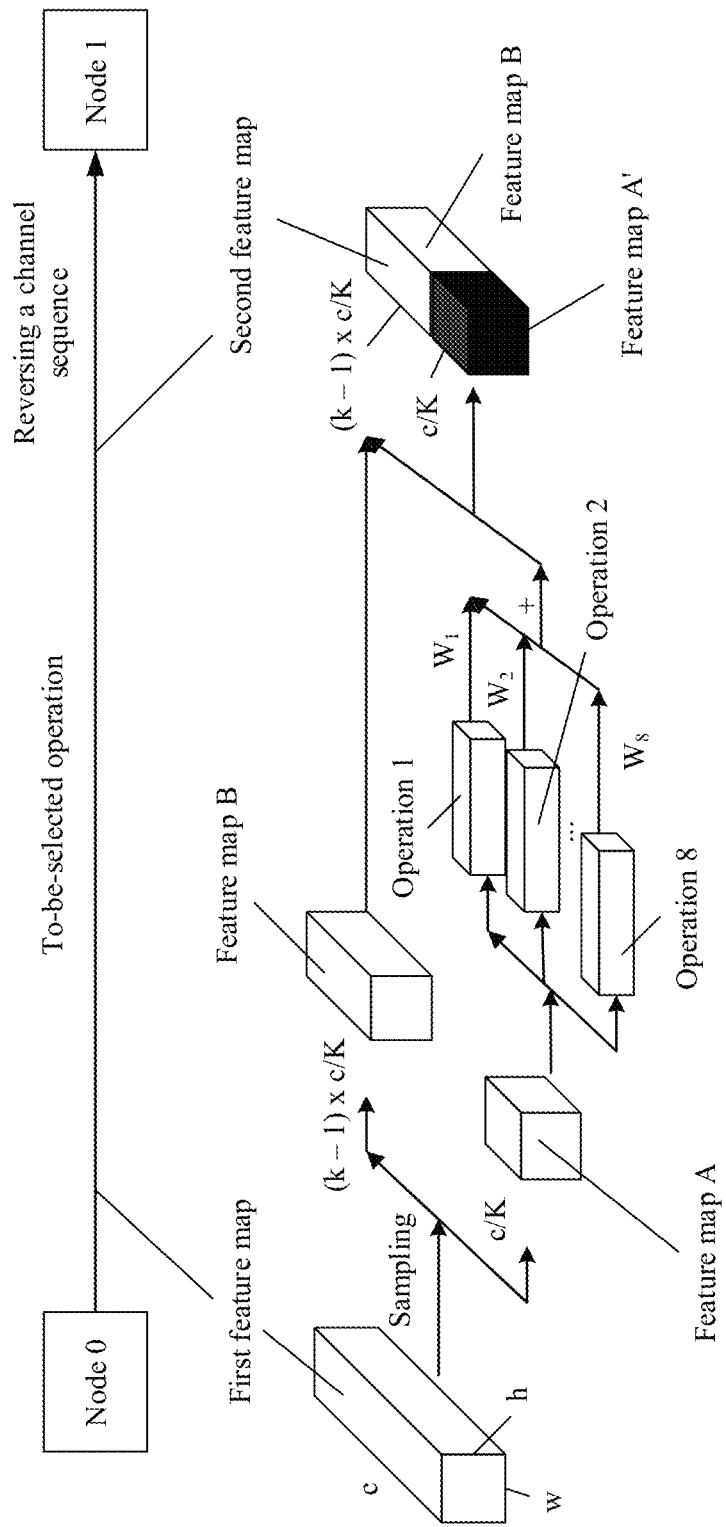
FIG. 11 is a schematic diagram of a process of processing a feature map.

The following describes a process for processing the feature map with reference to FIG. 11.

As shown in FIG. 11, the node 0 outputs a first feature map, some feature maps of the first feature map are processed by using the to-be-selected operation, to obtain a second feature map, and the second feature map may be input to the node 1 and continue to be processed after a channel sequence is reversed.

Specifically, as shown in FIG. 11, a width of the first feature map is w, a height is h, and a quantity of channels is c. The first feature map may be divided into a feature map A and a feature map B based on the quantity of channels, where a quantity of channels of the feature map A is c/K, and a quantity of channels of the feature map B is c×(K−1)/K. The feature map A is processed by using the to-be-selected operation, and the to-be-selected operation includes an operation 1 to an operation 8. Weighted summation is separately performed on outputs obtained through the eight operations and weight parameters (W1 to W8) of the corresponding operations, to obtain a feature map A'.

The feature map B is not processed by using the to-be-selected operation. After the feature map A' is obtained, the feature map A' and the feature map B may be stitched in the channel dimension, to obtain the second feature map.

In the foregoing process, only c/K channels of the first feature map are processed by using the to-be-selected operation. This may reduce calculation complexity, and reduce search overheads.

K may be 2 or a multiple of 2. For example, K may be 2, 4, 6, 8, or the like.

Usually, a larger value of K corresponds to smaller search overheads. However, as the value of K increases, performance of the target neural network finally obtained through searching may be affected to some extent.

Optionally, the value of K is determined based on a size of a video random access memory resource of a device performing the method shown in FIG. 9.

Specifically, when the video random access memory resource of the device performing the foregoing method is relatively large, K may be set to a relatively small value. When the video random access memory resource of the device performing the foregoing method is relatively small, K may be set to a relatively large value.

For example, when the video random access memory resource of the device performing the foregoing method is relatively large, K is set to 4. When the video random access memory resource of the device performing the foregoing method is relatively small, K is set to 8.

Alternatively, the value of K may be determined based on both the size of the video random access memory resource of the device performing the foregoing method and the performance of the target neural network.

Specifically, a value of K may be first set based on the size of the video random access memory resource of the device performing the foregoing method, and then the value of K is adjusted based on performance of the target neural network.

For example, K may be set to 6 or 8 based on the size of the video random access memory resource of the device performing the foregoing method. However, when K is equal to 8, performance of the target neural network is not ideal, and when K is equal to 6, performance of the target neural network meets a requirement. Therefore, K may be set to 6.

Performance of the target neural network existing when K is set to different values may be obtained based on a test result.

For example, K is equal to 4. As shown in FIG. 10, an output feature map of the node 0 includes c channels. In this case, in the output feature map of the node 0 with c channels, c/4 channels may be processed by using the to-be-selected operation, to obtain a processed feature map, and a remaining feature map that is in the output feature map of the node 0 and that is not processed by using the to-be-selected operation has 3×c/4 channels. Then, the processed feature map (including c/4 channels) and the remaining feature map (including 3×c/4 channels) are stitched, to obtain a stitched feature map, where the stitched feature map has c channels, and the stitched feature map may be input to the node 1.

1004: Establish the target neural network based on the optimized construction units.

In this application, during neural architecture searching, because only some channels of the output feature map of each node in the construction unit are processed by using the to-be-selected operation, a quantity of channels of the feature map that are processed by using the to-be-selected operation is reduced. This further reduces a video random access memory occupied during searching, and reduces search overheads.

In addition, in this application, some channels of the output feature map of each node are selected to be processed by using the to-be-selected operation, so that an amount of data processed by using the to-be-selected operation is reduced. This may reduce a possibility of overfitting of a finally established target network to some extent.

Further, because the video random access memory occupied during searching can be reduced in this application, in a case of occupying a same video random access memory resource, an amount of each batch of data that is processed during searching can be increased in this application. This implements searching for a more complex neural architecture.

In this application, a channel sequence of a feature map obtained through stitching may be reversed, and then a feature map is input to a next node, so that after the feature map obtained through stitching is input to the next node, the next node may randomly select some channels of the feature map for processing.

Optionally, in an implementation, that an input feature map of a next node of each node is a feature map obtained by stitching the processed feature map and a remaining feature map includes: the input feature map of the next node of each node is a feature map obtained by stitching the processed feature map and the remaining feature map and reversing a channel sequence. Reversing the channel sequence may be re-adjusting a channel sequence of a stitched feature map.

Reversing the channel sequence may be re-adjusting a channel sequence of a stitched feature map.

After the processed feature map is obtained, the processed feature map and the remaining feature map may be stitched, to obtain the stitched feature map, and the channel sequence of the stitched feature map is reversed. Then, the feature map obtained after the channel sequence is reversed is input to the next node.

Alternatively, after the foregoing processed feature map is obtained, a channel sequence of the processed feature map and a channel sequence of the remaining feature map are reversed first, feature maps obtained after channel sequences are reversed are stitched, and then a stitched feature map is input to the next node for processing.

Figure 12:
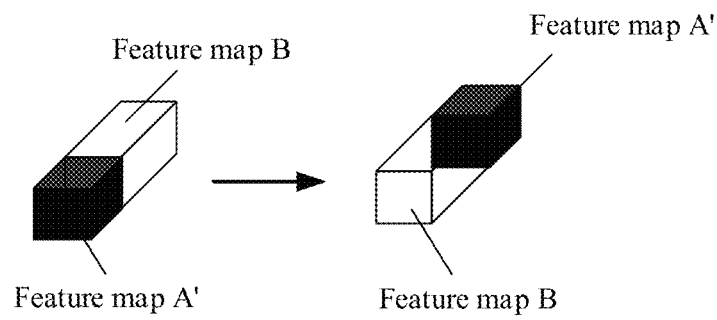
FIG. 12 is a schematic diagram of reversing a channel sequence of a feature map.
Figure 13:
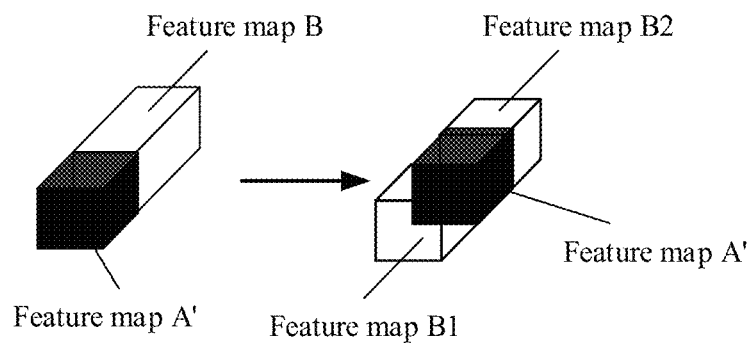
FIG. 13 is a schematic diagram of reversing a channel sequence of a feature map.

The following describes a process for reversing the channel sequence of the feature map with reference to FIG. 12 and FIG. 13.

For example, as shown in FIG. 12, c/K channels of the processed feature map may be shifted, that is, c/K channels of the processed feature map may be moved from one end of the feature map to another end, to obtain a feature map after stitching and reverse of the channel sequence. Specifically, in FIG. 12, a sequence of the feature map A' and the feature map B may be reversed.

For another example, as shown in FIG. 13, c/K channels of the stitched feature map may be inserted into c×(K−1)/K channels of the stitched feature map, to obtain a feature map after stitching and reverse of the channel sequence. Specifically, in FIG. 13, the feature map B may be divided into a feature map B1 and a feature map B2, and the feature map A' is inserted between the feature map B1 and the feature map B2.

In addition, in addition to channel sequence reverse manners shown in FIG. 12 and FIG. 13, the processed feature map may alternatively be divided into a plurality of feature submaps based on channels, and then the feature submaps are distributed between different channels of the remaining feature maps, to obtain a feature map after stitching and reverse of a channel sequence.

In this application, the channel sequence of the stitched feature map is reversed, and the channel sequence of the stitched feature map can be disordered, so that the next node may randomly select some channels of the feature map for processing. This may increase randomness of input data, and avoid overfitting of the finally obtained target neural network as much as possible.

In this application, an edge weight parameter may further be set to an edge between nodes of the construction unit, to increase stability of a finally searched target neural network. In addition, in a process of optimizing the construction unit in the search network, an edge whose corresponding edge weight parameter value is relatively large may be remained, and an edge whose edge weight parameter value is relatively small is discarded. Therefore, the finally established target neural network maintains specific stability.

Optionally, each of the plurality of construction units includes an input node and a plurality of intermediate nodes, a connection between nodes of each construction unit forms an edge, an input of each of the plurality of intermediate nodes is a sum of products of a plurality of corresponding input feature maps and edge weight parameters respectively corresponding to the plurality of input feature maps, each input corresponds to one edge weight parameter, and an edge weight parameter corresponding to each input is used to indicate a weight of each input during input to each intermediate node.

Figure 14:
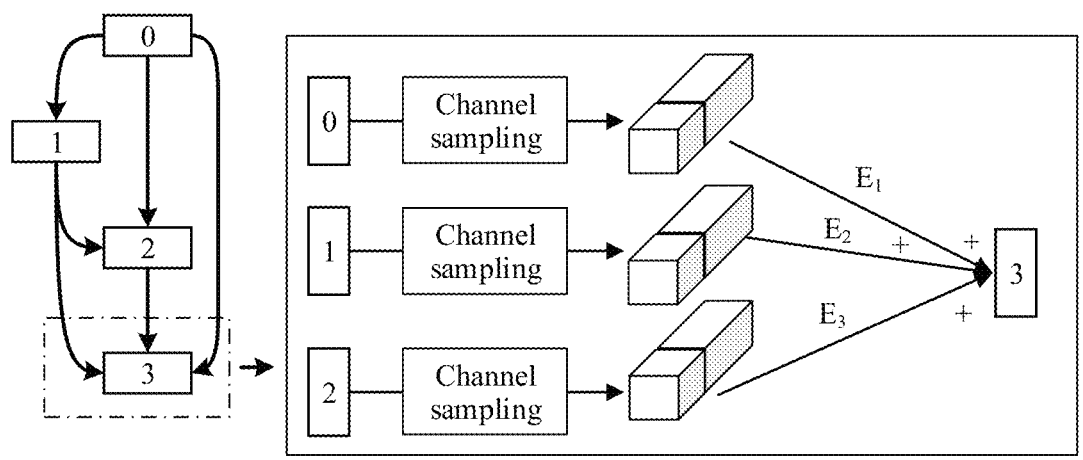
FIG. 14 is a schematic diagram of inputting different feature maps that are superimposed to a node.

For example, as shown in FIG. 14, it is assumed that a node 3 is an intermediate node, and output feature maps that are of the node 0, the node 1, and the node 2 and for which some channels are processed and a remaining feature map are stitched and input to the node 3. In this case, different weights may be set to each edge. An edge weight parameter of an edge between the node 0 and the node 3 is set to E1, an edge weight parameter of an edge between the node 1 and the node 3 is set to E2, and an edge weight parameter of an edge between the node 2 and the node 3 is set to E3. During superimposing, an output feature map of each edge is multiplied by a corresponding weight, and products are added, to obtain an input feature map of the node 3.

As shown in FIG. 14, output feature maps of three edges are F1, F2, and F3. In this case, the input feature map of the node 3 may be obtained according to formula (1).

$$F = E1 \times F1 + E2 \times F2 + E3 \times F3 \tag{1}$$

In the formula (1), F represents the input feature map of the node 3, and F1, F2, and F3 are respectively edge weight parameters corresponding to the output feature maps of the three edges.

In this application, importance degrees of different edges can be measured by setting an edge weight parameter. In an optimizing process, an edge whose corresponding edge weight parameter value is relatively large may be selected, and an edge whose edge weight parameter value is relatively small is discarded. Therefore, the finally established target neural network maintains specific stability.

In step 1003, that the network architectures of the construction units are optimized, to obtain the optimized construction units specifically includes: adjusting, in the search space, network architecture parameters of the construction units in the search network, to obtain the optimized construction units.

The optimized construction unit reserves edges corresponding to some edge weight parameters, and the optimized construction unit reserves operations corresponding to some to-be-selected operation weight parameters.

The network architectures of the construction units may be optimized by using training data and verification data, where the training data is used to train a convolution parameter, and the verification data trains a network architecture parameter. During training, a loss function may be first calculated and the convolution parameter is adjusted based on the training data, and then the loss function is calculated and the network architecture parameter is adjusted based on the verification data. In this way, iterative and alternate training is continuously performed, and the optimized construction unit is obtained after the training is completed.

Optionally, each of the plurality of construction units includes the input node and the plurality of intermediate nodes, each of the plurality of intermediate nodes corresponds to one level, an intermediate node at a first level is connected to the input node, an intermediate node at an $i^{th}$ level is connected to the input node, the intermediate node at the $i^{th}$ level is connected to an intermediate node at a previous $(i-1)^{th}$ level, and i is an integer greater than 1.

The search network may include a plurality of types of construction units. The following briefly describes common construction units included in the search network.

Optionally, the construction unit in the search network includes a first-type construction unit.

The first-type construction unit is a construction unit whose quantity (which may specifically be a quantity of channels) and size of an input feature map are respectively the same as a quantity and a size of an output feature map.

For example, an input of a first-type construction unit is a feature map with a size of C×D1×D2 (C is a quantity of channels, and D1 and D2 are a width and a height respectively), and a size of an output feature map processed by the first-type construction unit is still C×D1×D2.

The first-type construction unit may specifically be a normal cell (normal cell).

Optionally, the construction unit in the search network includes a second-type construction unit.

A resolution of an output feature map of the second-type construction unit is 1/M of an input feature map, a quantity of output feature maps of the second-type construction unit is M times a quantity of input feature maps, and M is a positive integer greater than 1.

M may usually be 2, 4, 6, 8, or the like.

For example, an input of a second-type construction unit is a feature map with a size of C×D1×D2 (C is a quantity of channels, D1 and D2 are a width and a height respectively, and a product of C1 and C2 may represent a resolution of the feature map), and a size of a feature map processed by the second-type construction unit is 4C×(½D1×½D2).

The second-type construction unit may specifically be a reduction cell (reduction cell).

Figure 15:
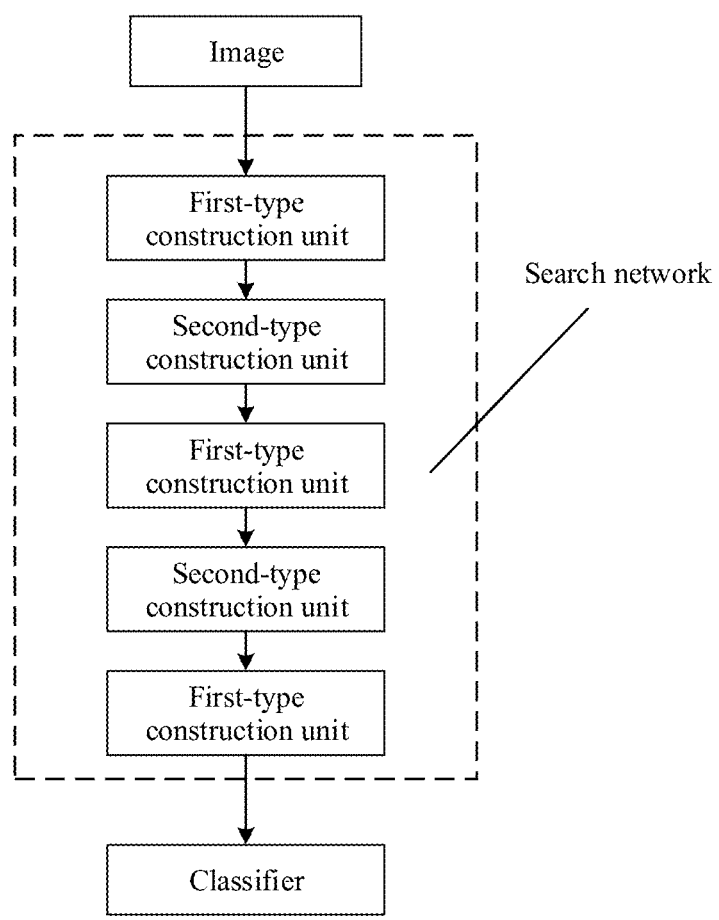
FIG. 15 is a schematic structural diagram of a search network.

When the search network includes the first-type construction unit and the second-type construction unit, an architecture of the search network may be shown in FIG. 15.

As shown in FIG. 15, the search network is formed by sequentially superimposing five construction units, where the first and the last construction units in the search network are first-type construction units, and a second-type construction unit is located between every two first-type construction units.

The first construction unit in the search network in FIG. 15 can process an input image. After processing the image, the first-type construction unit inputs a processed feature map to the second-type construction unit for processing, and the feature map is sequentially transmitted backwards, until the last first-type construction unit in the search network outputs a feature map.

The output feature map of the last first-type construction unit in the search network is sent to a classifier for processing, and the classifier classifies the image based on the feature map.

Figure 16:
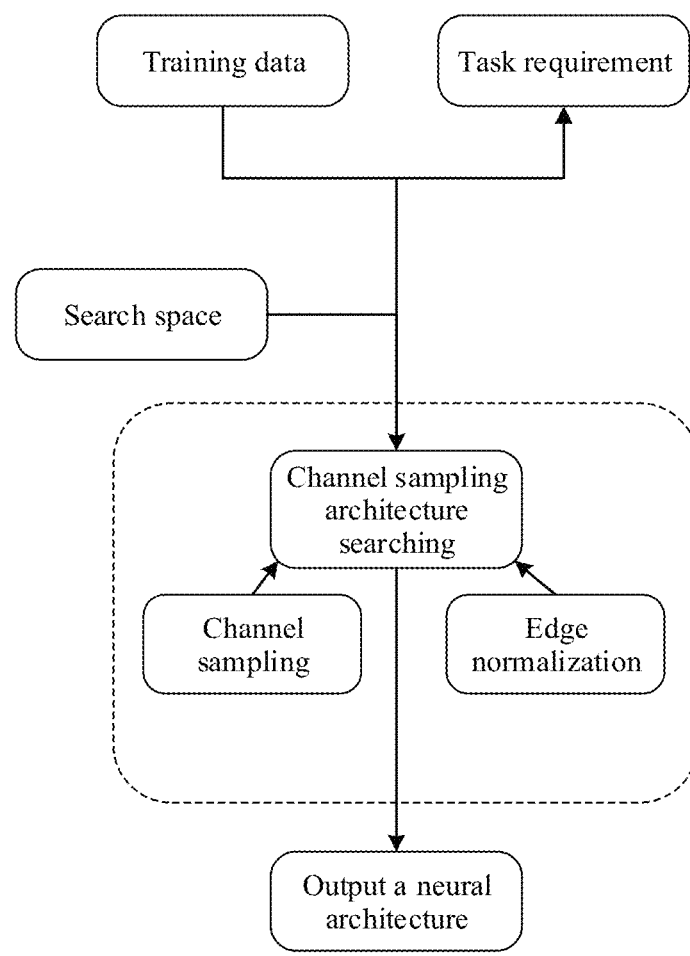
FIG. 16 is a schematic diagram of a neural architecture search method according to an embodiment of this application.

To facilitate understanding of a neural architecture search method in this embodiment of this application, the following briefly describes an entire process of the neural architecture search method in this embodiment of this application with reference to FIG. 16.

As shown in FIG. 16, a type of a to-be-established neural network may be determined based on a task requirement of the neural network (which is a type of task that the to-be-established neural network needs to process). Then, a size of search space and a quantity of construction units are determined based on the requirement of the task to be processed by the neural network, and the construction units are superimposed to obtain a search network. After the search network is obtained, network architectures of the construction units in the search network may be optimized (optimization may be performed by using training data). In a process of optimizing the network architecture of the construction unit, channel sampling architecture searching may be used. During channel sampling architecture searching, a major improvement includes channel sampling (that is, only some channels of an output feature map of each node are processed by using a to-be-selected operation, and a processed feature map and a feature map that is not processed are stitched and input to a next node) and edge normalization (in the construction unit, an input of each intermediate node is a sum of products of a plurality of corresponding input feature maps and edge weight parameters respectively corresponding to the plurality of input feature maps). Optimized construction units may form a neural network for output. An optimizing process in a dashed box in FIG. 16 is equivalent to an optimizing process in step 1003.

Figure 17:
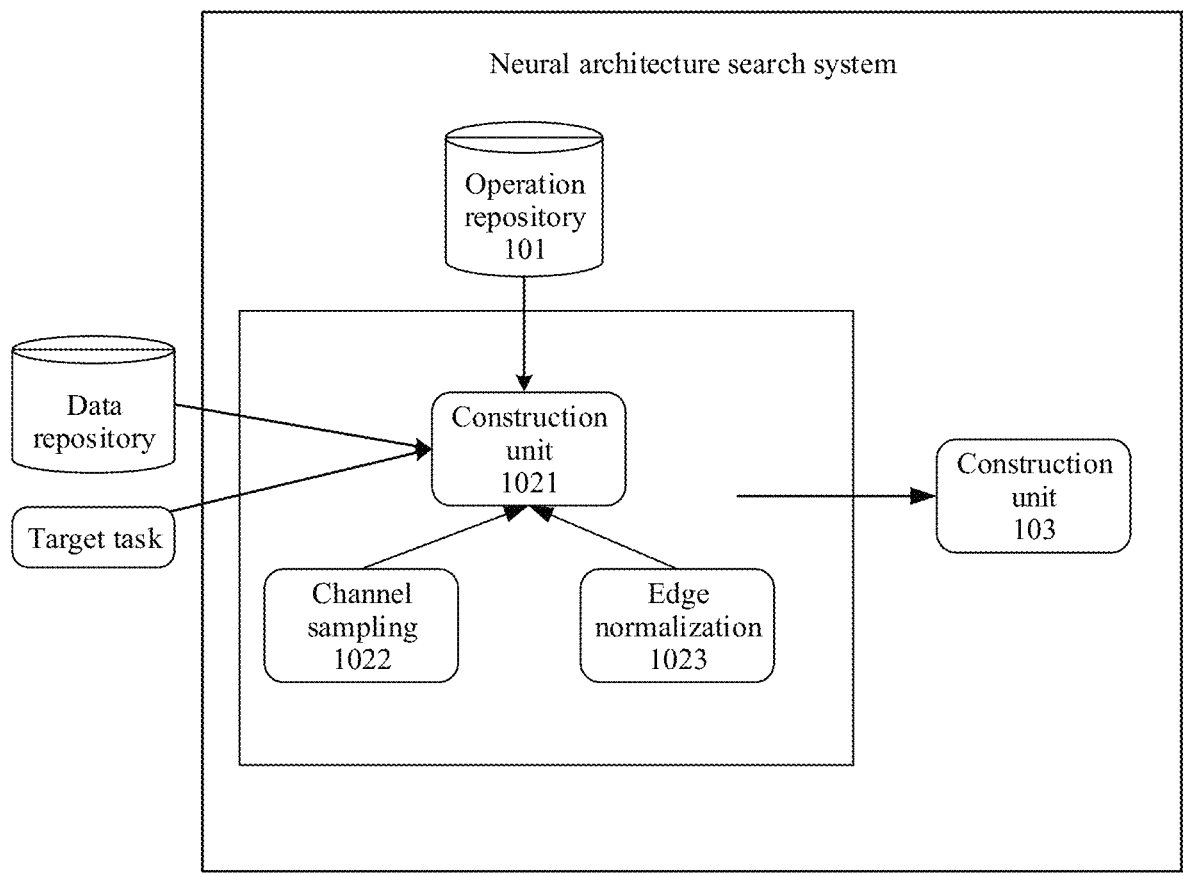
FIG. 17 is a schematic diagram of a neural architecture search method according to an embodiment of this application.

The neural architecture search method in this embodiment of this application may be performed by a neural architecture search system. FIG. 17 shows a process of performing the neural architecture search method in this embodiment of this application by the neural architecture search system. The following describes in detail content shown in FIG. 17.

In the neural architecture search system shown in FIG. 17, an operation repository 101 may include a preset basic operation in a convolutional neural network.

The operation repository 101 may include the following eight basic operations:

(1) average pooling (avg_pool_3×3) with a pooling kernel size of 3×3;

(2) maximum pooling (max_pool_3×3) with a pooling kernel size of 3×3;

(3) separable convolution (sep_conv_3×3) with a convolution kernel size of 3×3;

(4) separable convolution (sep_conv_5×5) with a convolution kernel size of 5×5;

(5) dilated convolution (dil_conv_3×3) with a convolution kernel size of 3×3 and a dilation rate of 2;

(6) dilated convolution (dil_conv_5×5) with a convolution kernel size of 5×5 and a dilation rate of 2;

(7) skip connection operation; and (8) zero operation (Zero, each neuron at a corresponding position is set to zero).

A channel sampling architecture searching module 102 is configured to optimize network architectures of construction units in a search network. In an optimizing process, in each construction unit, only some channels of an output feature map of each node are processed by using a to-be-selected operation, and a processed feature map and a feature map that is not processed are stitched and input to a next node as an input feature map of the next node.

A construction unit 103 is an optimized construction unit, configured to establish a target neural network.

Specifically, a size of the operation repository 101 (which is equivalent to the foregoing search space) and an initial quantity of construction units may be determined based on a target task, and then the construction units are superimposed based on the initial quantity of construction units, to obtain the search network. Then, the construction unit may be optimized to obtain an optimized construction unit. In an optimizing process, channel sampling 1022 is performed to implement that only some channels of the output feature map of each node are processed by using the to-be-selected operation, and edge normalization 1023 is performed to implement that nodes that are connected in the construction unit correspond to edge weight parameters. The optimized construction unit is the construction unit 103. Usually, there are a plurality of construction units 103, and the target neural network may be established based on the plurality of construction units 103.

A process of optimizing a construction unit 1021 in FIG. 17 is equivalent to an optimizing process in step 1003 in the method shown in FIG. 9. For a specific optimizing process, refer to related descriptions in step 1003.

To describe effects of the neural architecture search method in this embodiment of this application, the following compares the neural architecture search method in this embodiment of this application with an existing solution. Table 1 shows classification accuracy and search overheads of the neural architecture search method in this embodiment of this application and the existing solution in an image classification data set under a similar constraint condition.

In Table 1, NASNet-A, AmoebaNet-B, ENAS, PNAS, DARTS (2ND), and SNAS represent network architectures of the conventional solution. Table 1 shows search overheads of the conventional solution and this application in a data set CIFAR10. It can be learned from Table 1 that, compared with the conventional solution, the search overheads of the solution in this application are greatly reduced.

TABLE 1

| Network architecture | Search overheads (GDs) |
|---|---|
| NASNet-A | 1800 |
| AmoebaNet-B | 3150 |
| ENAS | 0.5 |
| PNAS | 225 |
| DARTS (2ND) | 4 |
| SNAS | 1.5 |
| This application | 0.1 |

In Table 2, ProxylessNAS is a network architecture of the existing solution. Table 2 shows search overheads of the existing solution and this application in a data set ImageNet.

TABLE 2

| Network architecture | Search overheads (GDs) |
|---|---|
| ProxylessNAS | 8.3 |
| This application | 3.8 |

It can be learned from Table 2 that, compared with the conventional solution, the search overheads of the solution in this application are greatly reduced in the data set ImageNet.

The following describes classification effects of the solution in this application and the conventional solution with reference to Table 3.

In Table 3, CIFAR10 and ImageNet are different data sets, and ImageNetTop1 and ImageNetTop5 are sub-indicators that are proportions (accuracy) of a correct result in a first result and first five results in the data set ImageNet. NASNet-A, AmoebaNet-B, ENAS, PNAS, DARTS (2ND), and SNAS respectively indicate different network architectures, and data under columns in which CIFAR10, ImageNetTop1, and ImageNetTop5 are located indicates classification accuracy.

TABLE 3

| Network architecture | CIFAR10 (%) | ImageNetTop1 (%) | ImageNetTop5 (%) |
|---|---|---|---|
| NASNet-A | 97.35 | 74.0 | 91.6 |
| AmoebaNet-B | 97.45 | 74.0 | 91.5 |
| ENAS | 97.11 | — | — |
| PNAS | 96.59 | 74.2 | 91.9 |
| DARTS (2ND) | 97.17 | 73.1 | 91.0 |
| SNAS | 97.15 | 72.3 | 90.8 |
| This application (CIFAR10) | 97.43 | 74.9 | 92.2 |
| This application (ImageNet) | — | 75.8 | 92.7 |

It can be learned from Table 3 that, compared with the existing solution, image classification accuracy in the data set CIFAR10 and the data set ImageNet is improved in this application.

The following describes in detail effects of the neural architecture search method in this embodiment of this application with reference to the data set CIFAR10. As shown in Table 4, when the neural architecture search method uses neither channel sampling nor edge normalization (which is equivalent to the conventional solution), classification accuracy is 97%, and search overheads are 0.4 GDs. However, when the neural architecture search method only uses edge normalization instead of channel sampling, classification accuracy is 97.18%, and search overheads remain unchanged at 0.4 GDs. However, when the neural architecture search method uses both channel sampling and edge normalization, classification accuracy is 97.43%, and search overheads are 0.1 GDs. This greatly reduces search overheads.

TABLE 4

| Channel sampling | Edge normalization | CIFAR10 | Search overheads |
|---|---|---|---|
| x | x | 97.00 | 0.4 GDs |
| x | ✓ | 97.18 | 0.4 GDs |
| ✓ | ✓ | 97.43 | 0.1 GDs |

The foregoing describes in detail the neural architecture search method in this embodiment of this application with reference to the accompanying drawings. A neural network established by using the neural architecture search method in this embodiment of this application may be used for image processing (for example, image classification) and the like. The following describes the specific applications.

Figure 18:
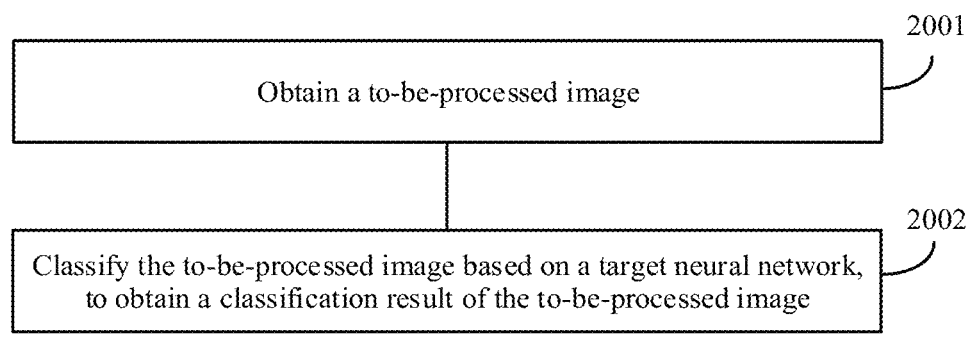
FIG. 18 is a schematic flowchart of an image processing method according to an embodiment of this application.

FIG. 18 is a schematic flowchart of an image processing method according to an embodiment of this application. It should be understood that limitations on, explanations for, and extensions to related content of the method shown in FIG. 9 are also applicable to the method shown in FIG. 18. Repeated descriptions are appropriately omitted in the following description of the method shown in FIG. 18. The method shown in FIG. 18 includes the following steps.

2001: Obtain a to-be-processed image.

2002: Classify the to-be-processed image based on a target neural network, to obtain a classification result of the to-be-processed image.

The target neural network is established by using a plurality of optimized construction units, and the plurality of optimized construction units is obtained by optimizing network architectures of a plurality of construction units in a search network. In each of the plurality of construction units, $c/K$ channels of an output feature map of each node are processed by using a to-be-selected operation, to obtain a processed feature map, and an input feature map of a next node of each node is a feature map obtained by stitching the processed feature map and a remaining feature map. The output feature map of each node has $c$ channels, the processed feature map has $c/K$ channels, and the remaining feature map has $c\times(K-1)/K$ channels. The remaining feature map is a feature map that is output by each node and that is not processed by using the to-be-selected operation, the to-be-selected operation includes all operations in the search space, and $c$ and $K$ are both integers greater than 1.

It should be understood that, in the method shown in FIG. 18, the target neural network is established by using the optimized construction units, and the target neural network may be a neural network trained by using training data (including a training image and a classification result of the training image). When the target neural network processes the to-be-processed image, all channels of the output feature map of each node in each optimized construction unit are processed by using the to-be-selected operation, and the feature map obtained after to-be-selected operation processing is input to the next node. This is a difference between image processing by using the target neural network and obtaining the target neural network through neural architecture search processing.

In this application, in a process of establishing the target neural network, some channels of the output feature map of each node in each construction unit are processed by using the to-be-selected operation, to reduce overfitting of a finally obtained target neural network. Therefore, image classification can be better performed by using the target neural network.

Optionally, that an input feature map of a next node of each node is a feature map obtained by stitching the processed feature map and a remaining feature map includes: the input feature map of the next node of each node is a feature map obtained by stitching the processed feature map and the remaining feature map and reversing a channel sequence.

In this application, in the process of establishing the target neural network, a channel sequence of a stitched feature map is reversed, and the channel sequence of the stitched feature map can be disordered, so that the next node may randomly select some channels of the feature map for processing. This may increase randomness of input data, and avoid overfitting of the finally obtained target neural network as much as possible. Therefore, image classification can be better performed by using the target neural network.

Optionally, each of the plurality of construction units includes an input node and a plurality of intermediate nodes, a connection between nodes of each construction unit forms an edge, an input of each of the plurality of intermediate nodes is a sum of products of a plurality of corresponding inputs and edge weight parameters respectively corresponding to the plurality of inputs, each input corresponds to one edge weight parameter, and an edge weight parameter corresponding to each input is used to indicate a weight of each input during input to each intermediate node.

In this application, in the process of establishing the target neural network, importance degrees of different edges can be measured by setting an edge weight parameter. In an optimizing process, an edge whose corresponding edge weight parameter value is relatively large may be selected, and an edge whose edge weight parameter value is relatively small is discarded. Therefore, the finally established target neural network maintains specific stability.

Optionally, each of the plurality of construction units includes the input node and the plurality of intermediate nodes, each of the plurality of intermediate nodes corresponds to one level, an intermediate node at a first level is connected to the input node, an intermediate node at an $i^{th}$ level is connected to the input node, the intermediate node at the $i^{th}$ level is connected to an intermediate node at a previous $(i-1)^{th}$ level, and i is an integer greater than 1.

Figure 19:
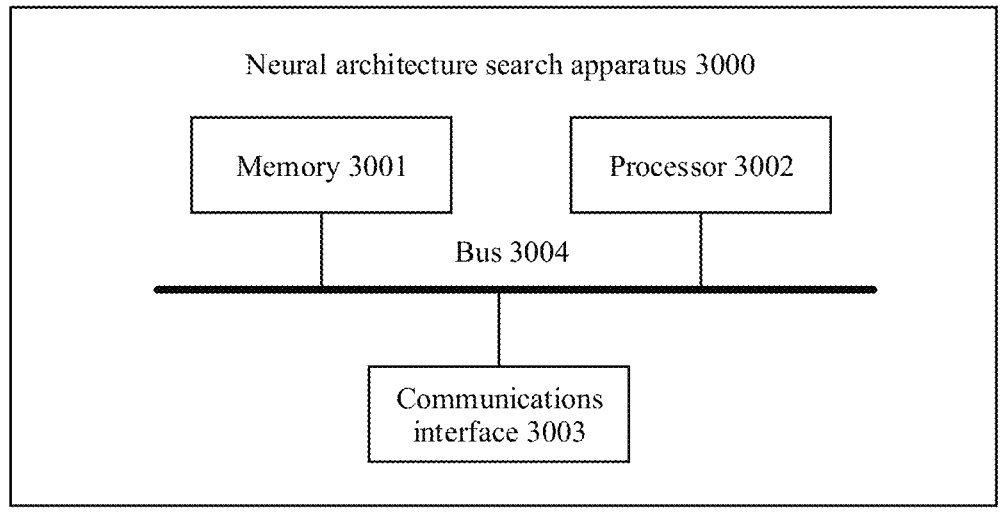
FIG. 19 is a schematic block diagram of a neural architecture search apparatus according to an embodiment of this application.

FIG. 19 is a schematic diagram of a hardware architecture of a neural architecture search apparatus according to an embodiment of this application. A neural architecture search apparatus 3000 shown in FIG. 19 (the apparatus 3000 may specifically be a computer device) includes a memory 3001, a processor 3002, a communications interface 3003, and a bus 3004. The memory 3001, the processor 3002, and the communications interface 3003 are communicatively connected to each other by using the bus 3004.

The memory 3001 may be a read-only memory (read-only memory, ROM), a static storage device, a dynamic storage device, or a random access memory (random access memory, RAM). The memory 3001 may store a program. When executing the program stored in the memory 3001, the processor 3002 is configured to perform steps of the neural architecture search method in this embodiment of this application.

The processor 3002 may be a general-purpose central processing unit (central processing unit, CPU), a microprocessor, an application-specific integrated circuit (application-specific integrated circuit, ASIC), a graphics processing unit (graphics processing unit, GPU), or one or more integrated circuits, and is configured to execute a related program, to implement the neural architecture search method in the method embodiments of this application.

The processor 3002 may alternatively be an integrated circuit chip and has a signal processing capability. In an implementation process, the steps of the neural architecture search method in this application may be completed by using a hardware integrated logic circuit or an instruction in a form of software in the processor 3002.

The processor 3002 may alternatively be a general-purpose processor, a digital signal processor (digital signal processor, DSP), an application-specific integrated circuit (ASIC), a field programmable gate array (field programmable gate array, FPGA) or another programmable logic device, a discrete gate or transistor logic device, or a discrete hardware component. The processor may implement or perform the methods, the steps, and logical block diagrams that are disclosed in the embodiments of this application. The general-purpose processor may be a microprocessor, or the processor may be any conventional processor or the like. The steps of the methods disclosed with reference to the embodiments of this application may be directly performed and completed by using a hardware decoding processor, or may be performed and completed by using a combination of hardware and software modules in a decoding processor. A software module may be located in a mature storage medium in the art, such as a random access memory, a flash memory, a read-only memory, a programmable read-only memory, an electrically erasable programmable memory, a register, or the like. The storage medium is located in the memory 3001. The processor 3002 reads information in the memory 3001, and completes, in combination with hardware of the processor 3002, a function that needs to be executed by a unit included in the neural architecture search apparatus, or performs the neural architecture search method in the method embodiments of this application.

The communications interface 3003 uses a transceiver apparatus, for example but not for limitation, a transceiver, to implement communication between the apparatus 3000 and another device or a communications network. For example, information about a to-be-established neural network and training data required in a process of establishing a neural network may be obtained through the communications interface 3003.

The bus 3004 may include a path for transmitting information between the components (for example, the memory 3001, the processor 3002, and the communications interface 3003) of the apparatus 3000.

Figure 20:
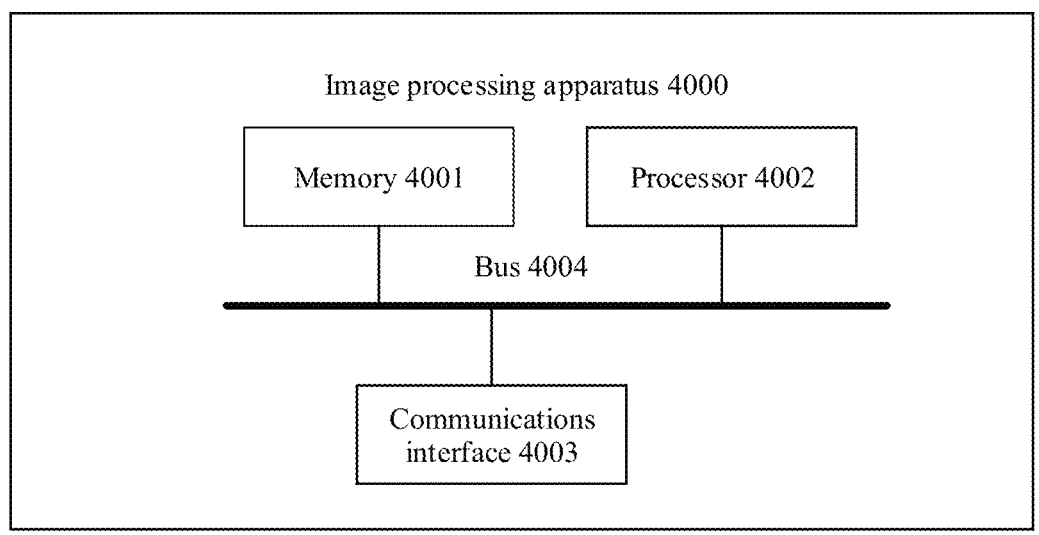
FIG. 20 is a schematic block diagram of an image processing apparatus according to an embodiment of this application.

FIG. 20 is a schematic diagram of a hardware architecture of an image processing apparatus according to an embodiment of this application. An image processing apparatus 4000 shown in FIG. 20 includes a memory 4001, a processor 4002, a communications interface 4003, and a bus 4004. The memory 4001, the processor 4002, and the communications interface 4003 are communicatively connected to each other by using the bus 4004.

The memory 4001 may be a ROM, a static storage device, or a RAM. The memory 4001 may store a program. When executing the program stored in the memory 4001, the processor 4002 and the communications interface 4003 are configured to perform steps of the image processing method in this embodiment of this application.

The processor 4002 may be a general-purpose CPU, a microprocessor, an ASIC, a GPU, or one or more integrated circuits, and is configured to execute a related program, to implement a function that needs to be executed by a unit in the image processing apparatus in this embodiment of this application, or perform the image processing method in the method embodiments of this application.

The processor 4002 may alternatively be an integrated circuit chip and has a signal processing capability. In an implementation process, the steps of the image processing method in this application may be completed by using a hardware integrated logic circuit or an instruction in a form of software in the processor 4002.

The foregoing processor 4002 may alternatively be a general-purpose processor, a DSP, an ASIC, an FPGA or another programmable logic device, a discrete gate or transistor logic device, or a discrete hardware component. The processor may implement or perform the methods, steps, and logical block diagrams that are disclosed in the embodiments of this application. The general-purpose processor may be a microprocessor, or the processor may be any conventional processor or the like. The steps of the methods disclosed with reference to the embodiments of this application may be directly performed and completed by using a hardware decoding processor, or may be performed and completed by using a combination of hardware and software modules in a decoding processor. A software module may be located in a mature storage medium in the art, such as a random access memory, a flash memory, a read-only memory, a programmable read-only memory, an electrically erasable programmable memory, a register, or the like. The storage medium is located in the memory 4001. The processor 4002 reads information in the memory 4001, and completes, in combination with hardware of the processor 4002, a function that needs to be executed by a unit included in the image processing apparatus in this embodiment of this application, or performs the image processing method in the method embodiments of this application.

The communications interface 4003 uses a transceiver apparatus, for example but not for limitation, a transceiver, to implement communication between the apparatus 4000 and another device or a communications network. For example, a to-be-processed image may be obtained through the communications interface 4003.

The bus 4004 may include a path for transmitting information between the components (for example, the memory 4001, the processor 4002, and the communications interface 4003) of the apparatus 4000.

Figure 21:
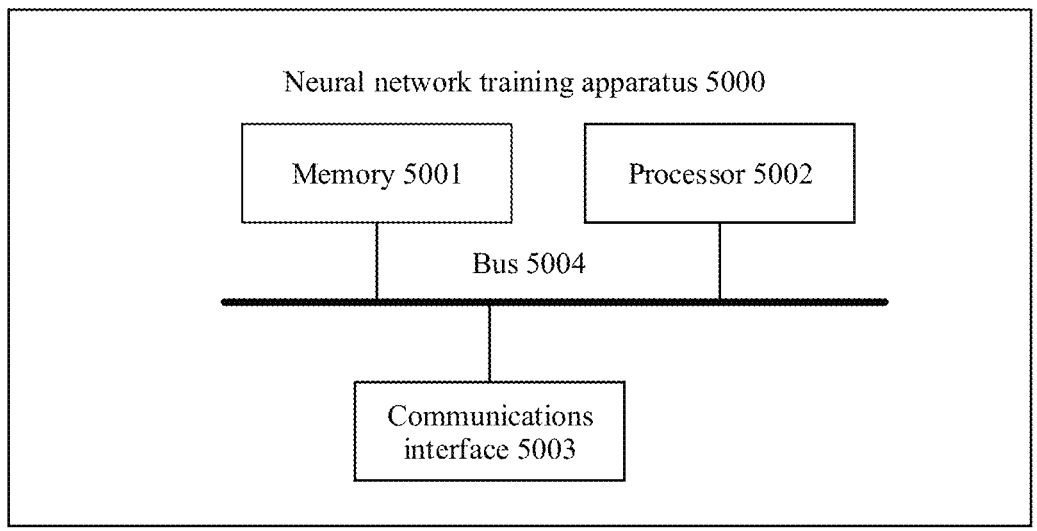
FIG. 21 is a schematic block diagram of a neural network training apparatus according to an embodiment of this application.

FIG. 21 is a schematic diagram of a hardware architecture of a neural network training apparatus according to an embodiment of this application. Similar to the foregoing apparatus 3000 and 4000, a neural network training apparatus 5000 shown in FIG. 21 includes a memory 5001, a processor 5002, a communications interface 5003, and a bus 5004. The memory 5001, the processor 5002, and the communications interface 5003 are communicatively connected to each other by using the bus 5004.

After a neural network is established by using the neural architecture search apparatus shown in FIG. 19, the neural network may be trained by using the neural network training apparatus 5000 shown in FIG. 21, and a trained neural network may be used to perform the image processing method in this embodiment of this application.

Specifically, the apparatus shown in FIG. 21 may obtain training data and a to-be-trained neural network from the outside through the communications interface 5003, and then the processor trains the to-be-trained neural network based on the training data.

It should be noted that, although only the memory, the processor, and the communications interface are shown in each of the apparatus 3000, the apparatus 4000, and the apparatus 5000, in a specific implementation process, a person skilled in the art should understand that the apparatus 3000, the apparatus 4000, and the apparatus 5000 each may further include another component necessary for normal running. In addition, based on a specific requirement, a person skilled in the art should understand that the apparatus 3000, the apparatus 4000, and the apparatus 5000 each may further include a hardware component for implementing another additional function. In addition, a person skilled in the art should understand that the apparatus 3000, the apparatus 4000, and the apparatus 5000 each may include only components necessary for implementing the embodiments of this application, but not necessarily include all the components shown in FIG. 19, FIG. 20, and FIG. 21.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in another manner. For example, the described apparatus embodiment is merely an example. For example, division into units is merely division into logical functions and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A neural architecture search method, comprising:
    determining search space and a plurality of construction units, wherein each of the plurality of construction units is a network architecture obtained by connecting a plurality of nodes by using a basic operation of a neural network;
    superimposing the plurality of construction units to obtain a search network, wherein in each of the plurality of construction units, c/K channels of an output feature map of each node are processed by using a to-be-selected operation to obtain a processed feature map, an input feature map of a next node of each node is a feature map obtained by stitching the processed feature map and a remaining feature map, the output feature map of each node has c channels, the processed feature map has c/K channels, the remaining feature map has c×(K−1)/K channels, the remaining feature map is a feature map that is output by each node and that is not processed by using the to-be-selected operation, the to-be-selected operation comprises all operations in the search space, and c and K are integers greater than 1;
    adjusting, in the search space, network architectures of the construction units in the search network to obtain optimized construction units; and
    establishing a target neural network based on the optimized construction units.

2. The method according to claim 1, wherein that an input feature map of a next node of each node is a feature map obtained by stitching the processed feature map and a remaining feature map comprises:
    the input feature map of the next node of each node is a feature map obtained by stitching the processed feature map and the remaining feature map and reversing a channel sequence.

3. The method according to claim 1, wherein each of the plurality of construction units comprises an input node and a plurality of intermediate nodes, a connection between nodes of each construction unit forms an edge, an input of each of the plurality of intermediate nodes is a sum of products of a plurality of corresponding inputs and edge weight parameters respectively corresponding to the plurality of inputs, each input corresponds to one edge weight parameter, and an edge weight parameter corresponding to each input is used to indicate a weight of each input during input to each intermediate node.

4. The method according to claim 3, wherein the adjusting, in the search space, network architectures of the construction units in the search network, to obtain optimized construction units comprises:
    adjusting, in the search space, network architecture parameters of the construction units in the search network to obtain optimized construction units, wherein the network architecture parameter comprises a to-be-selected operation weight parameter and the edge weight parameter, the optimized construction unit reserves edges corresponding to some edge weight parameters, and the optimized construction unit reserves operations corresponding to some to-be-selected operation weight parameters.

5. The method according to claim 3, wherein each of the plurality of construction units comprises an input node and the plurality of intermediate nodes, each of the plurality of intermediate nodes corresponds to one level, an intermediate node at a first level is connected to the input node, an intermediate node at an $i^{th}$ level is connected to the input node, the intermediate node at the $i^{th}$ level is connected to an intermediate node at a previous $(i-1)^{th}$ level, and i is an integer greater than 1.

6. The method according to claim 1, wherein K is determined based on a size of a video random access memory resource of a device performing the method.

7. An image processing method, comprising:
    obtaining a to-be-processed image; and
    classifying the to-be-processed image based on a target neural network to obtain a classification result of the to-be-processed image, wherein:
    the target neural network is established by using a plurality of optimized construction units, the plurality of optimized construction units is obtained by optimizing network architectures of a plurality of construction units in a search network, in each of the plurality of construction units, c/K channels of an output feature map of each node are processed by using a to-be-selected operation to obtain a processed feature map, an input feature map of a next node of each node is a feature map obtained by stitching the processed feature map and a remaining feature map, the output feature map of each node has c channels, the processed feature map has c/K channels, the remaining feature map has c×(K−1)/K channels, the remaining feature map is a feature map that is output by each node and that is not processed by using the to-be-selected operation, the to-be-selected operation comprises all operations in a search space, and c and K are integers greater than 1.

8. The method according to claim 7, wherein that an input feature map of a next node of each node is a feature map obtained by stitching the processed feature map and a remaining feature map comprises:
    the input feature map of the next node of each node is a feature map obtained by stitching the processed feature map and the remaining feature map and reversing a channel sequence.

9. The method according to claim 7, wherein each of the plurality of construction units comprises an input node and a plurality of intermediate nodes, a connection between nodes of each construction unit forms an edge, an input of each of the plurality of intermediate nodes is a sum of products of a plurality of corresponding inputs and edge weight parameters respectively corresponding to the plurality of inputs, each input corresponds to one edge weight parameter, and an edge weight parameter corresponding to each input is used to indicate a weight of each input during input to each intermediate node.

10. The method according to claim 9, wherein each of the plurality of construction units comprises the input node and the plurality of intermediate nodes, each of the plurality of intermediate nodes corresponds to one level, an intermediate node at a first level is connected to the input node, an intermediate node at an $i^{th}$ level is connected to the input node, the intermediate node at the $i^{th}$ level is connected to an intermediate node at a previous $(i-1)^{th}$ level, and i is an integer greater than 1.

11. A neural architecture search apparatus, comprising:
a memory, configured to store a program; and
at least one processor, the at least one processor configured to execute the program stored in the memory, wherein when executing the program stored in the memory, the at least one processor is configured to:
determine search space and a plurality of construction units, wherein each of the plurality of construction units is a network architecture obtained by connecting a plurality of nodes by using a basic operation of a neural network;
superimpose the plurality of construction units to obtain a search network, wherein in each of the plurality of construction units, c/K channels of an output feature map of each node are processed by using a to-be-selected operation to obtain a processed feature map, an input feature map of a next node of each node is a feature map obtained by stitching the processed feature map and a remaining feature map, the output feature map of each node has c channels, the processed feature map has c/K channels, the remaining feature map has c×(K−1)/K channels, the remaining feature map is a feature map that is output by each node and that is not processed by using the to-be-selected operation, the to-be-selected operation comprises all operations in the search space, and c and K are integers greater than 1;
adjust, in the search space, network architectures of the construction units in the search network, to obtain optimized construction units; and
establish a target neural network based on the optimized construction units.

12. A non-transitory computer-readable storage medium wherein the computer-readable medium stores program code used by a device for execution, and the program code is used by the device to:
determine search space and a plurality of construction units, wherein each of the plurality of construction units is a network architecture obtained by connecting a plurality of nodes by using a basic operation of a neural network;
superimpose the plurality of construction units to obtain a search network, wherein in each of the plurality of construction units, c/K channels of an output feature map of each node are processed by using a to-be-selected operation to obtain a processed feature map, an input feature map of a next node of each node is a feature map obtained by stitching the processed feature map and a remaining feature map, the output feature map of each node has c channels, the processed feature map has c/K channels, the remaining feature map has c×(K−1)/K channels, the remaining feature map is a feature map that is output by each node and that is not processed by using the to-be-selected operation, the to-be-selected operation comprises all operations in the search space, and c and K are integers greater than 1;
optimize, in the search space, network architectures of the construction units in the search network to obtain optimized construction units; and
establish a target neural network based on the optimized construction units.

13. The non-transitory computer-readable storage medium of claim 12, wherein that an input feature map of a next node of each node is a feature map obtained by stitching the processed feature map and a remaining feature map comprises:
the input feature map of the next node of each node is a feature map obtained by stitching the processed feature map and the remaining feature map and reversing a channel sequence.

14. The non-transitory computer-readable storage medium of claim 12, wherein each of the plurality of construction units comprises an input node and a plurality of intermediate nodes, a connection between nodes of each construction unit forms an edge, an input of each of the plurality of intermediate nodes is a sum of products of a plurality of corresponding inputs and edge weight parameters respectively corresponding to the plurality of inputs, each input corresponds to one edge weight parameter, and an edge weight parameter corresponding to each input is used to indicate a weight of each input during input to each intermediate node.

15. The non-transitory computer-readable storage medium of claim 14, wherein the optimizing, in the search space, network architectures of the construction units in the search network, to obtain optimized construction units comprises:
adjusting, in the search space, network architecture parameters of the construction units in the search network to obtain optimized construction units, wherein the network architecture parameter comprises a to-be-selected operation weight parameter and the edge weight parameter, the optimized construction unit reserves edges corresponding to some edge weight parameters, and the optimized construction unit reserves operations corresponding to some to-be-selected operation weight parameters.

16. The non-transitory computer-readable storage medium of claim 12, wherein each of the plurality of construction units comprises the input node and the plurality of intermediate nodes, each of the plurality of intermediate nodes corresponds to one level, an intermediate node at a first level is connected to the input node, an intermediate node at an $i^{th}$ level is connected to the input node, the intermediate node at the $i^{th}$ level is connected to an intermediate node at a previous $(i-1)^{th}$ level, and i is an integer greater than 1.

17. A chip, wherein the chip comprises at least one processor and a data interface, and the at least one processor reads, through the data interface, instructions stored in a non-transitory memory, to:
determine search space and a plurality of construction units, wherein each of the plurality of construction units is a network architecture obtained by connecting a plurality of nodes by using a basic operation of a neural network;
superimpose the plurality of construction units to obtain a search network, wherein in each of the plurality of construction units, c/K channels of an output feature map of each node are processed by using a to-be-selected operation to obtain a processed feature map, an input feature map of a next node of each node is a feature map obtained by stitching the processed feature map and a remaining feature map, the output feature map of each node has c channels, the processed feature map has c/K channels, the remaining feature map has $c\times(K-1)/K$ channels, the remaining feature map is a feature map that is output by each node and that is not processed by using the to-be-selected operation, the to-be-selected operation comprises all operations in the search space, and c and K are integers greater than 1;

optimize, in the search space, network architectures of the construction units in the search network to obtain optimized construction units; and establish a target neural network based on the optimized construction units.

18. The chip of claim 17, wherein that an input feature map of a next node of each node is a feature map obtained by stitching the processed feature map and a remaining feature map comprises:

the input feature map of the next node of each node is a feature map obtained by stitching the processed feature map and the remaining feature map and reversing a channel sequence.

19. The chip of claim 17, wherein each of the plurality of construction units comprises an input node and a plurality of intermediate nodes, a connection between nodes of each construction unit forms an edge, an input of each of the plurality of intermediate nodes is a sum of products of a plurality of corresponding inputs and edge weight parameters respectively corresponding to the plurality of inputs, each input corresponds to one edge weight parameter, and an edge weight parameter corresponding to each input is used to indicate a weight of each input during input to each intermediate node.

* * * * *

UNITED STATES PATENT AND TRADEMARK OFFICE
CERTIFICATE OF CORRECTION

| | | |
|---|---|---|
| PATENT NO. | : 12,026,938 B2 | Page 1 of 1 |
| APPLICATION NO. | : 17/573220 | |
| DATED | : July 2, 2024 | |
| INVENTOR(S) | : Yuhui Xu et al. | |

It is certified that error appears in the above-identified patent and that said Letters Patent is hereby corrected as shown below:

In the Claims

In Column 39, In Line 46, In Claim 12, after "medium" insert -- , --.

Signed and Sealed this
Fifth Day of November, 2024

Katherine Kelly Vidal
*Director of the United States Patent and Trademark Office*